US009075441B2

(12) United States Patent
St. Hilaire et al.

(10) Patent No.: US 9,075,441 B2
(45) Date of Patent: Jul. 7, 2015

(54) GESTURE BASED CONTROL USING THREE-DIMENSIONAL INFORMATION EXTRACTED OVER AN EXTENDED DEPTH OF FIELD

(75) Inventors: Pierre St. Hilaire, Belmont, CA (US); John S. Underkoffler, Los Angeles, CA (US)

(73) Assignee: Oblong Industries, Inc., Los Angeles, CA (US)

( * ) Notice: Subject to any disclaimer, the term of this patent is extended or adjusted under 35 U.S.C. 154(b) by 278 days.

(21) Appl. No.: 12/417,252

(22) Filed: Apr. 2, 2009

(65) Prior Publication Data

US 2009/0231278 A1    Sep. 17, 2009

Related U.S. Application Data

(63) Continuation-in-part of application No. 11/350,697, filed on Feb. 8, 2006, now Pat. No. 7,598,942, and a continuation-in-part of application No. 12/109,263, filed on Apr. 24, 2008.

(60) Provisional application No. 61/041,892, filed on Apr. 2, 2008, provisional application No. 61/105,243, filed on Oct. 14, 2008, provisional application No. 61/105,253, filed on Oct. 14, 2008.

(51) Int. Cl.
| | |
|---|---|
| *G06F 3/033* | (2013.01) |
| *G06F 3/01* | (2006.01) |
| *G06F 3/03* | (2006.01) |
| *G06K 9/00* | (2006.01) |
| *G06K 9/32* | (2006.01) |

(52) U.S. Cl.
CPC .............. *G06F 3/017* (2013.01); *G06F 3/0325* (2013.01); *G06K 9/00375* (2013.01); *G06K 2009/3225* (2013.01)

(58) Field of Classification Search
None
See application file for complete search history.

(56) References Cited

U.S. PATENT DOCUMENTS

| 4,843,568 A | 6/1989 | Krueger et al. |
| 5,454,043 A | 9/1995 | Freeman |

(Continued)

FOREIGN PATENT DOCUMENTS

WO    WO 99/35633 A3    7/1999

OTHER PUBLICATIONS

Form PCT/ISA/220, PCT/US06/04497, "PCT Notification of Transmittal of the International Search Report and the Written Opinion of the International Searching Authority, or the Declaration," 1 pg.

(Continued)

*Primary Examiner* — Joseph Haley
*Assistant Examiner* — Ifedayo Iluyomade
(74) *Attorney, Agent, or Firm* — IPR Law Group, PC

(57) ABSTRACT

Systems and methods are described for gesture-based control using three-dimensional information extracted over an extended depth of field. The system comprises a plurality of optical detectors coupled to at least one processor. The optical detectors image a body. At least two optical detectors of the plurality of optical detectors comprise wavefront coding cameras. The processor automatically detects a gesture of the body, wherein the gesture comprises an instantaneous state of the body. The detecting comprises aggregating gesture data of the gesture at an instant in time. The gesture data includes focus-resolved data of the body within a depth of field of the imaging system. The processor translates the gesture to a gesture signal, and uses the gesture signal to control a component coupled to the processor.

90 Claims, 12 Drawing Sheets

(56) References Cited

U.S. PATENT DOCUMENTS

| | | |
|---|---|---|
| 5,581,276 A | 12/1996 | Cipolla et al. |
| 5,594,469 A | 1/1997 | Freeman et al. |
| 5,982,352 A | 11/1999 | Pryor |
| 6,002,808 A | 12/1999 | Freeman |
| 6,072,494 A | 6/2000 | Nguyen |
| 6,075,895 A | 6/2000 | Qiao et al. |
| 6,191,773 B1 | 2/2001 | Maruno et al. |
| 6,215,890 B1 | 4/2001 | Matsuo et al. |
| 6,222,465 B1 | 4/2001 | Kumar et al. |
| 6,256,033 B1 | 7/2001 | Nguyen |
| 6,385,331 B2 | 5/2002 | Harakawa et al. |
| 6,501,515 B1 | 12/2002 | Iwamura |
| 7,034,807 B2 | 4/2006 | Maggioni |
| 7,042,440 B2 | 5/2006 | Pryor et al. |
| 7,058,204 B2 | 6/2006 | Hildreth et al. |
| 7,109,970 B1 | 9/2006 | Miller |
| 7,129,927 B2 | 10/2006 | Mattsson |
| 7,170,492 B2 | 1/2007 | Bell |
| 7,227,526 B2 | 6/2007 | Hildreth et al. |
| 7,259,747 B2 | 8/2007 | Bell |
| 7,340,077 B2 | 3/2008 | Gokturk et al. |
| 7,348,963 B2 | 3/2008 | Bell |
| 7,379,563 B2 | 5/2008 | Shamaie |
| 7,379,566 B2 | 5/2008 | Hildreth |
| 7,389,591 B2 | 6/2008 | Jaiswal et al. |
| 7,421,093 B2 | 9/2008 | Hildreth et al. |
| 7,428,542 B1 | 9/2008 | Fink et al. |
| 7,430,312 B2 | 9/2008 | Gu |
| 7,466,308 B2 * | 12/2008 | Dehlin .......... 345/175 |
| 7,598,942 B2 * | 10/2009 | Underkoffler et al. ...... 345/158 |
| 2002/0041327 A1 * | 4/2002 | Hildreth et al. .......... 348/42 |
| 2002/0065950 A1 | 5/2002 | Katz et al. |
| 2002/0186200 A1 | 12/2002 | Green |
| 2002/0186221 A1 | 12/2002 | Bell |
| 2002/0194393 A1 | 12/2002 | Hrischuk et al. |
| 2003/0169944 A1 * | 9/2003 | Dowski et al. .......... 382/279 |
| 2004/0125076 A1 | 7/2004 | Green |
| 2004/0183775 A1 | 9/2004 | Bell |
| 2004/0193413 A1 | 9/2004 | Wilson et al. |
| 2005/0006154 A1 | 1/2005 | Back et al. |
| 2005/0257013 A1 | 11/2005 | Ma |
| 2006/0010400 A1 * | 1/2006 | Dehlin et al. .......... 715/856 |
| 2006/0098873 A1 * | 5/2006 | Hildreth et al. .......... 382/181 |
| 2006/0173929 A1 | 8/2006 | Wilson |
| 2006/0187196 A1 | 8/2006 | Underkoffler et al. |
| 2006/0208169 A1 | 9/2006 | Breed et al. |
| 2006/0281453 A1 | 12/2006 | Jaiswal et al. |
| 2007/0139541 A1 | 6/2007 | Fein et al. |
| 2008/0018595 A1 | 1/2008 | Hildreth et al. |
| 2008/0030460 A1 | 2/2008 | Hildreth et al. |
| 2008/0056536 A1 | 3/2008 | Hildreth et al. |
| 2008/0062123 A1 | 3/2008 | Bell |
| 2008/0137913 A1 | 6/2008 | Hildreth |
| 2008/0166022 A1 | 7/2008 | Hildreth |
| 2008/0187178 A1 | 8/2008 | Shamaie |
| 2008/0199071 A1 | 8/2008 | Gu |
| 2008/0205701 A1 | 8/2008 | Shamaie et al. |
| 2008/0208517 A1 | 8/2008 | Shamaie |
| 2008/0219502 A1 | 9/2008 | Shamaie |
| 2008/0235965 A1 | 10/2008 | Jaiswal et al. |
| 2008/0267447 A1 | 10/2008 | Kelusky et al. |
| 2008/0273755 A1 | 11/2008 | Hildreth |
| 2009/0003686 A1 | 1/2009 | Gu |
| 2009/0027337 A1 | 1/2009 | Hildreth |
| 2009/0031240 A1 | 1/2009 | Hildreth |
| 2009/0051648 A1 | 2/2009 | Shamaie et al. |
| 2009/0052785 A1 | 2/2009 | Shamaie |
| 2009/0079813 A1 | 3/2009 | Hildreth |

OTHER PUBLICATIONS

Form PCT/ISA/210, PCT/US06/04497, "PCT International Search Report," 2 pgs.
Form PCT/ISA/237, PCT/US06/04497, "PCT Written Opinion of the International Searching Authority," 3 pgs.
Form PCT/ISA/220, PCT/US08/61457, "PCT Notification of Transmittal of the International Search Report and the Written Opinion of the International Searching Authority, or the Declaration," 1 pg.
Form PCT/ISA/210, PCT/US08/61457, "PCT International Search Report," 2 pgs.
Form PCT/ISA/237, PCT/US08/61457, "PCT Written Opinion of the International Searching Authority," 6 pgs.
Form PCT/ISA/220, PCT/US09/39285, "PCT Notification of Transmittal of the International Search Report and the Written Opinion of the International Searching Authority, or the Declaration," 1 pg.
Form PCT/ISA/210, PCT/US09/39285, "PCT International Search Report," 2 pgs.
Form PCT/ISA/237, PCT/US09/39285, "PCT Written Opinion of the International Searching Authority," 6 pgs.
Form/IB/373, PCT/US06/04497, "International Report on Patentability," 1 pg.

* cited by examiner

1. Depict pose with left hand as viewed from back p = pinkie finger
r = ring finger
m = middle finger
i = index finger
t = thumb ^ = curled non-thumb
> = curled thumb
| = straight finger or thumb pointed straight up
\ or / = straight finger or thumb pointed at angle
- = thumb pointing straight sideways
x = finger or thumb pointing into plane

| Pose name | p | r | m | i | t |
|---|---|---|---|---|---|
| | | | Hand Pose | | |
| flat | \| | \| | \| | \| | \| |
| fist | ^ | ^ | ^ | ^ | > |
| mime gun | ^ | ^ | ^ | \| | - |
| 2 or peace | ^ | ^ | \ | / | > |
| one-finger point | ^ | ^ | ^ | \| | > |
| two-finger point | ^ | ^ | \| | \| | > |
| x·y·z | ^ | ^ | x | \| | - |
| ok | \| | \| | \| | ^ | > |
| pinkie point | \| | ^ | ^ | ^ | > |
| bracket | x | x | x | x | x |
| 4 | \ | \ | \| | / | > |
| 3 | ^ | \ | \| | / | > |
| 5 | \ | \ | \| | / | / |

FIG.3

2. Add hand orientation to complete pose must specify two variables:
1. palm direction (if hand were flat)
2. finger direction (if hand were flat)

| | |
|---|---|
| - | medial |
| + | lateral |
| x | anterior |
| * | posterior |
| ^ | cranial |
| v | caudal | orientation variables come after colon, e.g.:

| | | |
|---|---|---|
| ^ ^ x \| - : - x | = | x-y-z start position |
| ^ ^ \ / > : * v | = | upside-down v |

FIG.4

3. Two-hand combos

| Hand 1 | Hand 2 | Pose |
|---|---|---|
| ^ ^ ^ ^ > : x ^ | ^ ^ ^ ^ > : x ^ | full stop |
| ^ ^ ^ \| - : x - | ^ ^ ^ \| - : x ^ | snapshot |
| \| \| \| \| \| : v x | \| \| \| \| \| : - x | rudder and throttle start position |

FIG.5

4. Orientation blends
   Achieve variable blending by enclosing pairs
   e.g.:

| | | | | : (vx) (x^)        flat at 45 degrees pitch toward screen

^ ^ | | > : ( - ( - v ) ) x   two-finger point rolled medially to 22.5
                                 degrees (halfway between palm medial
                                 and palm rolled to 45 degrees)

| Gest I.D. | Description | Hand 1 Pose | Hand 1 Motion | Hand 2 Pose | Hand 2 Motion |
|---|---|---|---|---|---|
| 1 | point at object (invoke and move cursor) | ^^^\|-:-x | point mime gun | | |
| 2 | select object | ^^\|:-x | drop thumb to select | | |
| 3 | move spatially / zoom in/out | ^^x\|-:-x | rotate/translate | | |
| 4 | snapshot | ^^^-:x- | make square with 2 hands | ^^^\|-:x^ | make square with 2 hands |
| 5 | demarcate rectangular region | ^^^-:x- | make square then adjust size | ^^^\|-:x^ | make square then adjust size |
| 6 | clear the decks | \|\|\|\|:+x | sweep hand laterally | \|\|\|\|:-x | sweep hand medially |
| 7 | organize objects into a circle | ^^^\|-:-^ | look through circle of O.K. sign | | |
| 8 | two-finger point at objects | ^^\|-:-x | point | | |
| 9 | two-finger select object | ^^\|:-x | drop thumb to select | | |
| 10 | mark start time | xxxxx:-^ | strike pose | | |
| 11 | mode change 1 | \|\|\|\|:-^ | strike pose - make "T" with two hands | \|\|\|\|:v- | strike pose - make "T" with two hands |
| 12 | mode change 11 | \|\|\|\|:-^ | strike pose - parallel hands | \|\|\|\|:-^ | strike pose - parallel hands |
| 13 | push back and slide workspace | \|\|\|\|-:x^ | push palm toward screen - - move sideways to find new regions | | |

FIG.8/1

| | | | | |
|---|---|---|---|---|
| 14 | enter sub-application | ‖‖‖‖ : x ^ | strike pose | ‖‖‖‖ : x ^ | strike pose |
| 15 | return from sub-application | ‖‖‖‖ : . ^ | strike pose | ‖‖‖‖ : . ^ | strike pose |
| 16 | select option | ^^^ \| - : - x | medial roll | | |
| 17 | roll time forward/back | ‖‖‖‖ : v x | Yaw hand at elbow while keeping hand parallel to floor | | |
| 18 | stop time | ‖‖‖‖ : x ^ | strike pose | | |
| 19 | loop time | ^^^ \| - : x ^ | circular motion with "L" | | |
| 20 | demarcate irregular region | ^^^ \| - : v x | start with 2 finger tips together. 1 hand holds start position. | ^^^ \| - : - x | other hand traces out shape - select "click" for vertices |
| 21 | tag object | \| ^^^ > : - x | pinky-point at object then roll hand medially | | |
| 22 | group data streams | ^^^ \| - : v x | bring finger tips of two hands together | ^^^ \| - : v x | bring finger tips of two hands together |
| 23 | restore encapsulated workspace | ‖‖‖‖ : + x | sweep hand medially | ‖‖‖‖ : - x | sweep hand laterally |

FIG.8/2

GESTURE BASED CONTROL USING THREE-DIMENSIONAL INFORMATION EXTRACTED OVER AN EXTENDED DEPTH OF FIELD

RELATED APPLICATION

This application is a continuation in part of U.S. patent application Ser. No. 11/350,697, filed Feb. 8, 2006.

This application claims the benefit of U.S. patent application Ser. No. 61/041,892, filed Apr. 2, 2008.

This application is a continuation in part of U.S. patent application Ser. No. 12/109,263, filed Apr. 24, 2008.

This application claims the benefit of U.S. patent application Ser. No. 61/105,243, filed Oct. 14, 2008.

This application claims the benefit of U.S. patent application Ser. No. 61/105,253, filed Oct. 14, 2008.

FIELD OF THE INVENTION

This invention relates to the field of computer system in general and in particular to a system and method for a gesture based control system using extraction of three-dimensional information over an extended depth of field.

BACKGROUND

When extracting three-dimensional information over an extended depth of field in imaging systems, distance to a point in a scene can be estimated from its location in two or more images captured simultaneously. The three dimensional (3D) position of the point can be computed from basic geometric relationships when the 3D relationship between the imagers is known. The challenge in computing spatial location from multiple images, often referred to as stereo correlation or stereo depth computation, is automatically and accurately associating the mapping of a point in one image with its mapping in another image. This is most often done by correlating image features from one image to one or more others. The underlying assumption in all stereo matching methods, however, is that there must be some identifiable local contrast or feature in the image in order to match that point to its location in another image. Therefore a problem arises when there is no local contrast or feature in the image because of misfocus—stereo matching does not produce accurate results in regions of an image that are out of focus.

The conventional means for extending the focal depth of an image is to reduce the diameter of the camera's lens's pupil ("stopping down"). However, two side effects restrict the usefulness of the technique. First, the sensitivity of the imaging system is reduced by a factor equal to the square of the pupil diameter ratio. Second, the maximum spatial frequency response is reduced a factor equal to the pupil diameter ratio, which limits the resolution and contrast in the image. There is thus a tradeoff between depth of field, exposure time, and overall contrast in conventional imaging systems. In the case of a multiple camera ranging system, the net effect will be a compromise between stereoscopic depth accuracy and working range.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 3 is a diagram of poses in a gesture vocabulary in an embodiment of the invention.

FIG. 4 is a diagram of orientation in a gesture vocabulary in an embodiment of the invention.

FIG. 5 is a diagram of two hand combinations in a gesture vocabulary in an embodiment of the invention.

FIG. 8 is an example of commands in an embodiment of the system.

DETAILED DESCRIPTION

Systems and methods are described below for gesture-based control using three-dimensional information extracted over an extended depth of field. A system of an embodiment comprises a plurality of optical detectors coupled to at least one processor. The optical detectors image a body. At least two optical detectors of the plurality of optical detectors comprise wavefront coding cameras. The processor automatically detects a gesture of the body, wherein the gesture comprises an instantaneous state of the body. The detecting comprises aggregating gesture data of the gesture at an instant in time. The gesture data includes focus-resolved data of the body within a depth of field of the imaging system. The processor translates the gesture to a gesture signal, and uses the gesture signal to control a component coupled to the processor.

A method of an embodiment comprises imaging a body with an imaging system, wherein the imaging includes generating wavefront coded images of the body. The method automatically detects a gesture of a body, wherein the gesture comprises an instantaneous state of the body. The detecting comprises aggregating gesture data of the gesture at an instant in time. The gesture data includes focus-resolved data of the body within a depth of field of the imaging system. The method comprises translating the gesture to a gesture signal, and controlling a component coupled to a computer in response to the gesture signal.

In the following description, a number of features are described in detail in order to provide a more thorough understanding of the embodiments described herein. It is apparent that the invention may be practiced without these specific details. In other cases, well known features have not been described in detail.

System

Figure 1:
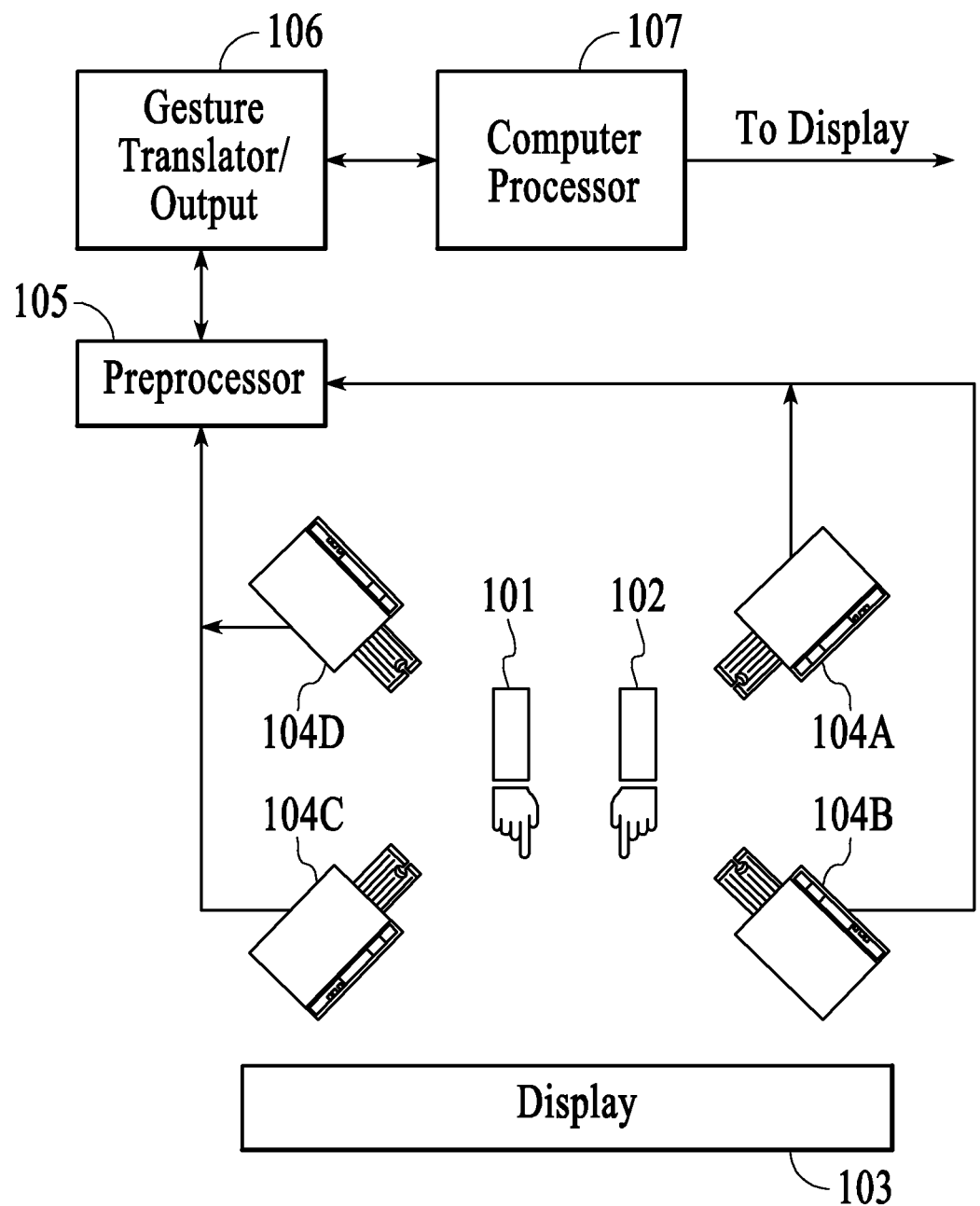
FIG. 1 is a diagram of an embodiment of the system of the invention.

A block diagram of an embodiment of the invention is illustrated in FIG. 1. A user locates his hands 101 and 102 in the viewing area of an array of cameras 104A-104D. The cameras detect location, orientation, and movement of the fingers and hands 101 and 102 and generate output signals to pre-processor 105. Pre-processor 105 translates the camera output into a gesture signal that is provided to the computer processing unit 107 of the system. The computer 107 uses the input information to generate a command to control one or more on screen cursors and provides video output to display 103.

Although the system is shown with a single user's hands as input, the invention may also be implemented using multiple users. In addition, instead of or in addition to hands, the system may track any part or parts of a user's body, including head, feet, legs, arms, elbows, knees, and the like.

In the embodiment shown, four cameras are used to detect the location, orientation, and movement of the user's hands 101 and 102. It should be understood that the invention may be used with more or fewer cameras without departing from the scope or spirit of the invention. In addition, although the cameras are disposed symmetrically in the example embodiment, there is no requirement of such symmetry in the invention. Any number or positioning of cameras that permits the location, orientation, and movement of the user's hands may be used in the invention.

In one embodiment of the invention, the cameras used are motion capture cameras capable of capturing grey-scale images. In one embodiment, the cameras used are those manufactured by Vicon, such as the Vicon MX40 camera. This camera includes on-camera processing and is capable of image capture at 1000 frames per second. A motion capture camera is capable of detecting and locating markers.

In the embodiment described, the cameras are used for optical detection. In other embodiments, the cameras or other detectors may be used for electromagnetic, magnetostatic, RFID, or any other suitable type of detection.

Pre-processor 105 is used to generate three dimensional space point reconstruction and skeletal point labeling. The gesture translator 106 is used to convert the 3D spatial information and marker motion information into a command language that can be interpreted by a computer processor to update the location, shape, and action of a cursor on a display. In an alternate embodiment of the invention, the pre-processor 105 and gesture translator 106 can be combined into a single device.

Computer 107 may be any general purpose computer such as manufactured by Apple, Dell, or any other suitable manufacturer. The computer 107 runs applications and provides display output. Cursor information that would otherwise come from a mouse or other prior art input device now comes from the gesture system.

Marker Tags

The invention contemplates the use of marker tags on one or more fingers of the user so that the system can locate the hands of the user, identify whether it is viewing a left or right hand, and which fingers are visible. This permits the system to detect the location, orientation, and movement of the users hands. This information allows a number of gestures to be recognized by the system and used as commands by the user.

The marker tags in one embodiment are physical tags comprising a substrate (appropriate in the present embodiment for affixing to various locations on a human hand) and discrete markers arranged on the substrate's surface in unique identifying patterns.

The markers and the associated external sensing system may operate in any domain (optical, electromagnetic, magnetostatic, etc.) that allows the accurate, precise, and rapid and continuous acquisition of their three-space position. The markers themselves may operate either actively (e.g. by emitting structured electromagnetic pulses) or passively (e.g. by being optically retroreflective, as in the present embodiment).

At each frame of acquisition, the detection system receives the aggregate cloud of recovered three-space locations comprising all markers from tags presently in the instrumented workspace volume (within the visible range of the cameras or other detectors). The markers on each tag are of sufficient multiplicity and are arranged in unique patterns such that the detection system can perform the following tasks: (1) segmentation, in which each recovered marker position is assigned to one and only one subcollection of points that form a single tag; (2) labelling, in which each segmented subcollection of points is identified as a particular tag; (3) location, in which the three-space position of the identified tag is recovered; and (4) orientation, in which the three-space orientation of the identified tag is recovered. Tasks (1) and (2) are made possible through the specific nature of the marker-patterns, as described below and as illustrated in one embodiment in FIG. 2.

The markers on the tags in one embodiment are affixed at a subset of regular grid locations. This underlying grid may, as in the present embodiment, be of the traditional Cartesian sort; or may instead be some other regular plane tessellation (a triangular/hexagonal tiling arrangement, for example). The scale and spacing of the grid is established with respect to the known spatial resolution of the marker-sensing system, so that adjacent grid locations are not likely to be confused. Selection of marker patterns for all tags should satisfy the following constraint: no tag's pattern shall coincide with that of any other tag's pattern through any combination of rotation, translation, or mirroring. The multiplicity and arrangement of markers may further be chosen so that loss (or occlusion) of some specified number of component markers is tolerated: After any arbitrary transformation, it should still be unlikely to confuse the compromised module with any other.

Figure 2:
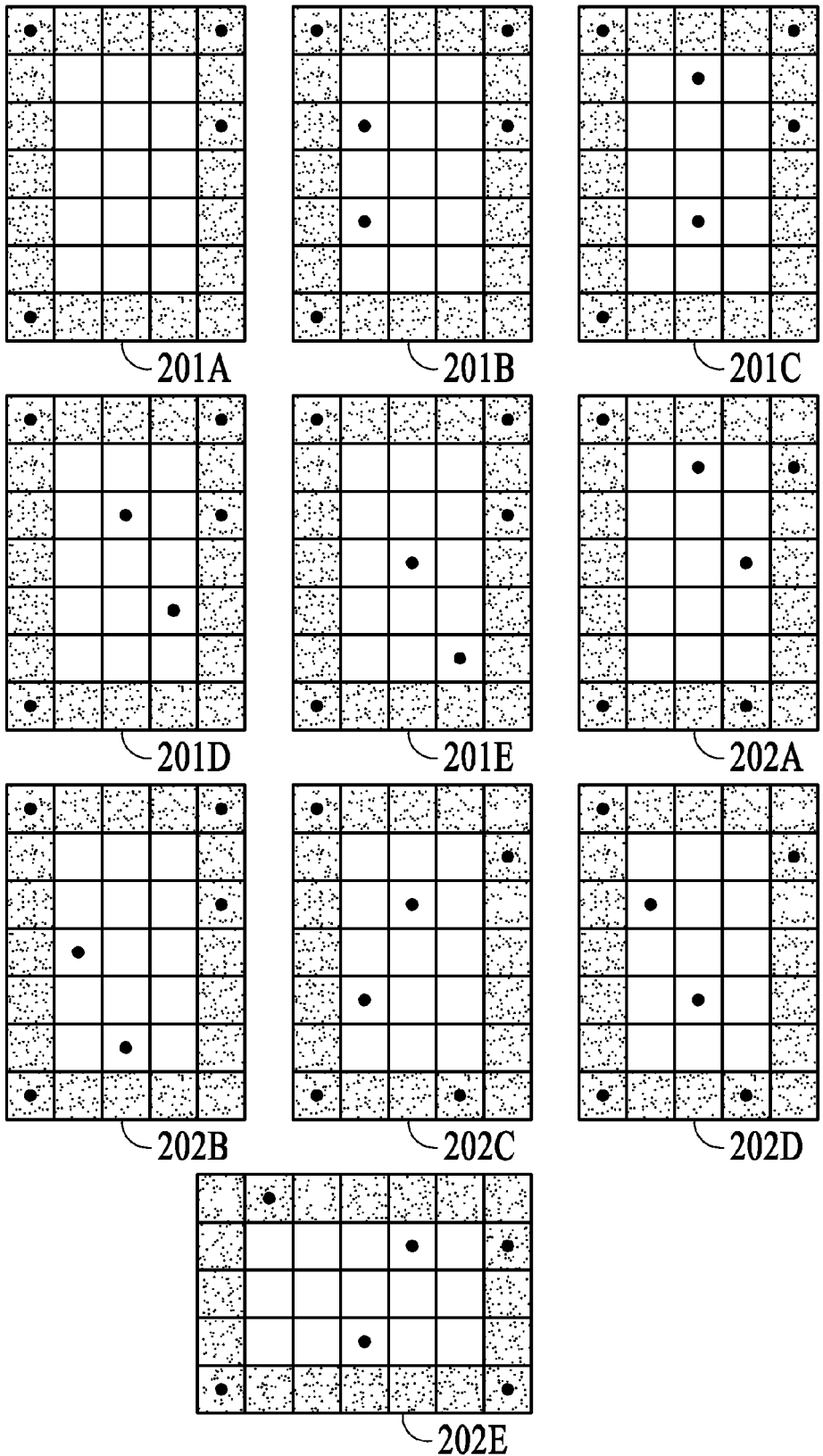
FIG. 2 is a diagram of an embodiment of marking tags of the invention.

Referring now to FIG. 2, a number of tags 201A-201E (left hand) and 202A-202E (right hand) are shown. Each tag is rectangular and consists in this embodiment of a 5×7 grid array. The rectangular shape is chosen as an aid in determining orientation of the tag and to reduce the likelihood of mirror duplicates. In the embodiment shown, there are tags for each finger on each hand. In some embodiments, it may be adequate to use one, two, three, or four tags per hand. Each tag has a border of a different grey-scale or color shade. Within this border is a 3×5 grid array. Markers (represented by the black dots of FIG. 2) are disposed at certain points in the grid array to provide information.

Qualifying information may be encoded in the tags' marker patterns through segmentation of each pattern into 'common' and 'unique' subpatterns. For example, the present embodiment specifies two possible 'border patterns', distributions of markers about a rectangular boundary. A 'family' of tags is thus established—the tags intended for the left hand might thus all use the same border pattern as shown in tags 201A-201E while those attached to the right hand's fingers could be assigned a different pattern as shown in tags 202A-202E. This subpattern is chosen so that in all orientations of the tags, the left pattern can be distinguished from the right pattern. In the example illustrated, the left hand pattern includes a marker in each corner and on marker in a second from corner grid location. The right hand pattern has markers in only two corners and two markers in non corner grid locations. An inspection of the pattern reveals that as long as any three of the four markers are visible, the left hand pattern can be positively distinguished from the left hand pattern. In one embodiment, the color or shade of the border can also be used as an indicator of handedness.

Each tag must of course still employ a unique interior pattern, the markers distributed within its family's common border. In the embodiment shown, it has been found that two markers in the interior grid array are sufficient to uniquely identify each of the ten fingers with no duplication due to rotation or orientation of the fingers. Even if one of the markers is occluded, the combination of the pattern and the handedness of the tag yields a unique identifier.

In the present embodiment, the grid locations are visually present on the rigid substrate as an aid to the (manual) task of affixing each retroreflective marker at its intended location. These grids and the intended marker locations are literally printed via color inkjet printer onto the substrate, which here is a sheet of (initially) flexible 'shrink-film'. Each module is cut from the sheet and then oven-baked, during which thermal treatment each module undergoes a precise and repeatable shrinkage. For a brief interval following this procedure, the cooling tag may be shaped slightly—to follow the longitudinal curve of a finger, for example; thereafter, the substrate is suitably rigid, and markers may be affixed at the indicated grid points.

In one embodiment, the markers themselves are three dimensional, such as small reflective spheres affixed to the substrate via adhesive or some other appropriate means. The three dimensionality of the markers can be an aid in detection and location over two dimensional markers. However either can be used without departing from the spirit and scope of the present invention.

At present, tags are affixed via Velcro or other appropriate means to a glove worn by the operator or are alternately affixed directly to the operator's fingers using a mild double-stick tape. In a third embodiment, it is possible to dispense altogether with the rigid substrate and affix—or 'paint'— individual markers directly onto the operator's fingers and hands.

Gesture Vocabulary

The invention contemplates a gesture vocabulary consisting of hand poses, orientation, hand combinations, and orientation blends. A notation language is also implemented for designing and communicating poses and gestures in the gesture vocabulary of the invention. The gesture vocabulary is a system for representing instantaneous 'pose states' of kinematic linkages in compact textual form. The linkages in question may be biological (a human hand, for example; or an entire human body; or a grasshopper leg; or the articulated spine of a lemur) or may instead be nonbiological (e.g. a robotic arm). In any case, the linkage may be simple (the spine) or branching (the hand). The gesture vocabulary system of the invention establishes for any specific linkage a constant length string; the aggregate of the specific ASCII characters occupying the string's 'character locations' is then a unique description of the instantaneous state, or 'pose', of the linkage.

Hand Poses

FIG. 3 illustrates hand poses in an embodiment of a gesture vocabulary using the invention. The invention supposes that each of the five fingers on a hand are used. These fingers are codes as p-pinkie, r-ring finger, m-middle finger, i-index finger, and t-thumb. A number of poses for the fingers and thumbs are defined and illustrated in FIG. 3. A gesture vocabulary string establishes a single character position for each expressible degree of freedom in the of the linkage (in this case, a finger). Further, each such degree of freedom is understood to be discretized (or 'quantized'), so that its full range of motion can be expressed through assignment of one of a finite number of standard ASCII characters at that string position. These degrees of freedom are expressed with respect to a body-specific origin and coordinate system (the back of the hand, the center of the grasshopper's body; the base of the robotic arm; etc.). A small number of additional gesture vocabulary character positions are therefore used to express the position and orientation of the linkage 'as a whole' in the more global coordinate system.

Still referring to FIG. 3, a number of poses are defined and identified using ASCII characters. Some of the poses are divided between thumb and non-thumb. The invention in this embodiment uses a coding such that the ASCII character itself is suggestive of the pose. However, any character may used to represent a pose, whether suggestive or not. In addition, there is no requirement in the invention to use ASCII characters for the notation strings. Any suitable symbol, numeral, or other representation maybe used without departing from the scope and spirit of the invention. For example, the notation may use two bits per finger if desired or some other number of bits as desired.

A curled finger is represented by the character "^" while a curled thumb by ">". A straight finger or thumb pointing up is indicated by "1" and at an angle by "\" or "/". "-" represents a thumb pointing straight sideways and "x" represents a thumb pointing into the plane.

Using these individual finger and thumb descriptions, a robust number of hand poses can be defined and written using the scheme of the invention. Each pose is represented by five characters with the order being p-r-m-i-t as described above. FIG. 3 illustrates a number of poses and a few are described here by way of illustration and example. The hand held flat and parallel to the ground is represented by "11111". A fist is represented by "^^^^>". An "OK" sign is represented by "111^>".

The character strings provide the opportunity for straightforward 'human readability' when using suggestive characters. The set of possible characters that describe each degree of freedom may generally be chosen with an eye to quick recognition and evident analogy. For example, a vertical bar ('|') would likely mean that a linkage element is 'straight', an ell ('L') might mean a ninety-degree bend, and a circumflex ('^') could indicate a sharp bend. As noted above, any characters or coding may be used as desired.

Any system employing gesture vocabulary strings such as described herein enjoys the benefit of the high computational efficiency of string comparison—identification of or search for any specified pose literally becomes a 'string compare' (e.g. UNIX's 'strcmp( )' function) between the desired pose string and the instantaneous actual string. Furthermore, the use of 'wildcard characters' provides the programmer or system designer with additional familiar efficiency and efficacy: degrees of freedom whose instantaneous state is irrelevant for a match may be specified as an interrogation point ('?'); additional wildcard meanings may be assigned.

Orientation

In addition to the pose of the fingers and thumb, the orientation of the hand can represent information. Characters describing global-space orientations can also be chosen transparently: the characters '<', '>', '^', and 'v' may be used to indicate, when encountered in an orientation character position, the ideas of left, right, up, and down. FIG. 4 illustrates hand orientation descriptors and examples of coding that combines pose and orientation. In an embodiment of the invention, two character positions specify first the direction of the palm and then the direction of the fingers (if they were straight, irrespective of the fingers' actual bends). The possible characters for these two positions express a 'body-centric' notion of orientation: '−', '+', '×', '*', '^', and 'v' describe medial, lateral, anterior (forward, away from body), posterior (backward, away from body), cranial (upward), and caudal (downward).

In the notation scheme of and embodiment of the invention, the five finger pose indicating characters are followed by a colon and then two orientation characters to define a complete command pose. In one embodiment, a start position is referred to as an "xyz" pose where the thumb is pointing straight up, the index finger is pointing forward and the middle finger is perpendicular to the index finger, pointing to the left when the pose is made with the right hand. This is represented by the string "^^x1-:-X".

'XYZ-hand' is a technique for exploiting the geometry of the human hand to allow full six-degree-of-freedom navigation of visually presented three-dimensional structure. Although the technique depends only on the bulk translation and rotation of the operator's hand—so that its fingers may in principal be held in any pose desired—the present embodiment prefers a static configuration in which the index finger points away from the body; the thumb points toward the ceiling; and the middle finger points left-right. The three fingers thus describe (roughly, but with clearly evident intent) the three mutually orthogonal axes of a three-space coordinate system: thus 'XYZ-hand'.

XYZ-hand navigation then proceeds with the hand, fingers in a pose as described above, held before the operator's body at a predetermined 'neutral location'. Access to the three translational and three rotational degrees of freedom of a three-space object (or camera) is effected in the following natural way: left-right movement of the hand (with respect to the body's natural coordinate system) results in movement along the computational context's x-axis; up-down movement of the hand results in movement along the controlled context's y-axis; and forward-back hand movement (toward/away from the operator's body) results in z-axis motion within the context. Similarly, rotation of the operator's hand about the index finger leads to a 'roll' change of the computational context's orientation; 'pitch' and 'yaw' changes are effected analogously, through rotation of the operator's hand about the middle finger and thumb, respectively.

Note that while 'computational context' is used here to refer to the entity being controlled by the XYZ-hand method—and seems to suggest either a synthetic three-space object or camera—it should be understood that the technique is equally useful for controlling the various degrees of freedom of real-world objects: the pan/tilt/roll controls of a video or motion picture camera equipped with appropriate rotational actuators, for example. Further, the physical degrees of freedom afforded by the XYZ-hand posture may be somewhat less literally mapped even in a virtual domain: In the present embodiment, the XYZ-hand is also used to provide navigational access to large panoramic display images, so that left-right and up-down motions of the operator's hand lead to the expected left-right or up-down 'panning' about the image, but forward-back motion of the operator's hand maps to 'zooming' control.

In every case, coupling between the motion of the hand and the induced computational translation/rotation may be either direct (i.e. a positional or rotational offset of the operator's hand maps one-to-one, via some linear or nonlinear function, to a positional or rotational offset of the object or camera in the computational context) or indirect (i.e. positional or rotational offset of the operator's hand maps one-to-one, via some linear or nonlinear function, to a first or higher-degree derivative of position/orientation in the computational context; ongoing integration then effects a non-static change in the computational context's actual zero-order position/orientation). This latter means of control is analogous to use of a an automobile's 'gas pedal', in which a constant offset of the pedal leads, more or less, to a constant vehicle speed.

The 'neutral location' that serves as the real-world XYZ-hand's local six-degree-of-freedom coordinate origin may be established (1) as an absolute position and orientation in space (relative, say, to the enclosing room); (2) as a fixed position and orientation relative to the operator herself (e.g. eight inches in front of the body, ten inches below the chin, and laterally in line with the shoulder plane), irrespective of the overall position and 'heading' of the operator; or (3) interactively, through deliberate secondary action of the operator (using, for example, a gestural command enacted by the operator's 'other' hand, said command indicating that the XYZ-hand's present position and orientation should henceforth be used as the translational and rotational origin).

It is further convenient to provide a 'detent' region (or 'dead zone') about the XYZ-hand's neutral location, such that movements within this volume do not map to movements in the controlled context.

Other poses may included:

[||||:vx] is a flat hand (thumb parallel to fingers) with palm facing down and fingers forward.

[||||:x^] is a flat hand with palm facing forward and fingers toward ceiling.

[||||:-x] is a flat hand with palm facing toward the center of the body (right if left hand, left if right hand) and fingers forward.

[^^^^-:-x] is a single-hand thumbs-up (with thumb pointing toward ceiling).

[^^^|-:-x] is a mime gun pointing forward.

Two Hand Combination

The present invention contemplates single hand commands and poses, as well as two-handed commands and poses. FIG. 5 illustrates examples of two hand combinations and associated notation in an embodiment of the invention. Reviewing the notation of the first example, "full stop" reveals that it comprises two closed fists. The "snapshot" example has the thumb and index finger of each hand extended, thumbs pointing toward each other, defining a goal post shaped frame. The "rudder and throttle start position" is fingers and thumbs pointing up palms facing the screen.

Orientation Blends

Figures 6, 7:
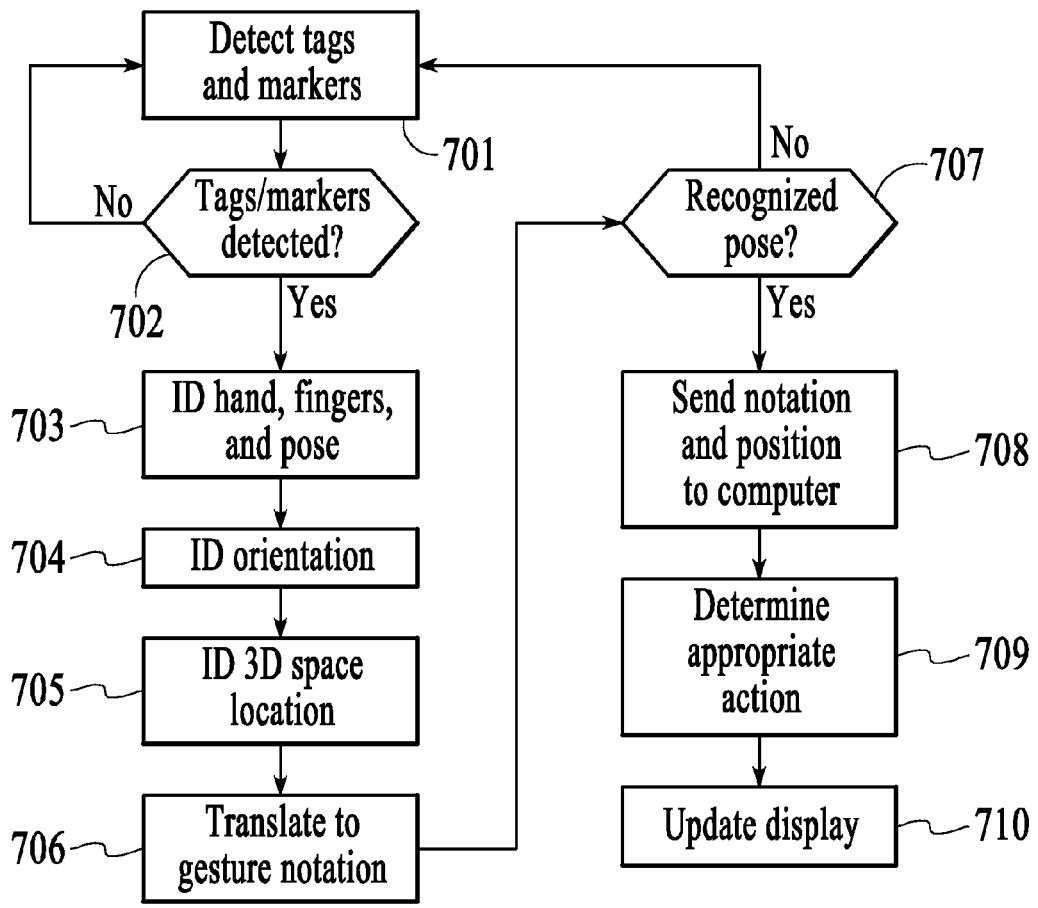
FIG. 6 is a diagram of orientation blends in a gesture vocabulary in an embodiment of the invention.
FIG. 7 is a flow diagram illustrating the operation an embodiment of the system of the invention.

FIG. 6 illustrates an example of an orientation blend in an embodiment of the invention. In the example shown the blend is represented by enclosing pairs of orientation notations in parentheses after the finger pose string. For example, the first command shows finger positions of all pointing straight. The first pair of orientation commands would result in the palms being flat toward the display and the second pair has the hands rotating to a 45 degree pitch toward the screen. Although pairs of blends are shown in this example, any number of blends are contemplated in the invention.

Example Commands

FIG. 8 illustrates a number of possible commands that may be used with the present invention. Although some of the discussion here has been about controlling a cursor on a display, the invention is not limited to that activity. In fact, the invention has great application in manipulating any and all data and portions of data on a screen, as well as the state of the display. For example, the commands may be used to take the place of video controls during play back of video media. The commands may be used to pause, fast forward, rewind, and the like. In addition, commands may be implemented to zoom in or zoom out of an image, to change the orientation of an image, to pan in any direction, and the like. The invention may also be used in lieu of menu commands such as open, close, save, and the like. In other words, any commands or activity that can be imagined can be implemented with hand gestures.

Operation

FIG. 7 is a flow diagram illustrating the operation of the invention in one embodiment. At step 701 the detection system detects the markers and tags. At decision block 702 it is determined if the tags and markers are detected. If not, the system returns to step 701. If the tags and markers are detected at step 702, the system proceeds to step 703. At step 703 the system identifies the hand, fingers and pose from the detected tags and markers. At steps 704 the system identifies the orientation of the pose. At step 705 the system identifies the three dimensional spatial location of the hand or hands that are detected. (Please note that any or all of steps 703, 704, and 705 may be combined as a single step).

At step 706 the information is translated to the gesture notation described above. At decision block 707 it is determined if the pose is valid. This may be accomplished via a simple string comparison using the generated notation string. If the pose is not valid, the system returns to step 701. If the pose is valid, the system sends the notation and position information to the computer at step 708. At step 709 the computer determines the appropriate action to take in response to the gesture and updates the display accordingly at step 710.

In one embodiment of the invention, steps 701-705 are accomplished by the on-camera processor. In other embodiments, the processing can be accomplished by the system computer if desired.

Parsing and Translation

The system is able to "parse" and "translate" a stream of low-level gestures recovered by an underlying system, and turn those parsed and translated gestures into a stream of command or event data that can be used to control a broad range of computer applications and systems. These techniques and algorithms may be embodied in a system consisting of computer code that provides both an engine implementing these techniques and a platform for building computer applications that make use of the engine's capabilities.

One embodiment is focused on enabling rich gestural use of human hands in computer interfaces, but is also able to recognize gestures made by other body parts (including, but not limited to arms, torso, legs and the head), as well as non-hand physical tools of various kinds, both static and articulating, including but not limited to calipers, compasses, flexible curve approximators, and pointing devices of various shapes. The markers and tags may be applied to items and tools that may be carried and used by the operator as desired.

The system described here incorporates a number of innovations that make it possible to build gestural systems that are rich in the range of gestures that can be recognized and acted upon, while at the same time providing for easy integration into applications.

The gestural parsing and translation system in one embodiment consists of:

1) a compact and efficient way to specify (encode for use in computer programs) gestures at several different levels of aggregation:
  a. a single hand's "pose" (the configuration and orientation of the parts of the hand relative to one another) a single hand's orientation and position in three-dimensional space.
  b. two-handed combinations, for either hand taking into account pose, position or both.
  c. multi-person combinations; the system can track more than two hands, and so more than one person can cooperatively (or competitively, in the case of game applications) control the target system.
  d. sequential gestures in which poses are combined in a series; we call these "animating" gestures.
  e. "grapheme" gestures, in which the operator traces shapes in space.

2) a programmatic technique for registering specific gestures from each category above that are relevant to a given application context.

3) algorithms for parsing the gesture stream so that registered gestures can be identified and events encapsulating those gestures can be delivered to relevant application contexts.

The specification system (1), with constituent elements (1*a*) to (1*f*), provides the basis for making use of the gestural parsing and translating capabilities of the system described here.

A single-hand "pose" is represented as a string of
  i) relative orientations between the fingers and the back of the hand,
  ii) quantized into a small number of discrete states.

Using relative joint orientations allows the system described here to avoid problems associated with differing hand sizes and geometries. No "operator calibration" is required with this system. In addition, specifying poses as a string or collection of relative orientations allows more complex gesture specifications to be easily created by combining pose representations with further filters and specifications.

Using a small number of discrete states for pose specification makes it possible to specify poses compactly as well as to ensure accurate pose recognition using a variety of underlying tracking technologies (for example, passive optical tracking using cameras, active optical tracking using lighted dots and cameras, electromagnetic field tracking, etc).

Gestures in every category (1*a*) to (1*f*) may be partially (or minimally) specified, so that non-critical data is ignored. For example, a gesture in which the position of two fingers is definitive, and other finger positions are unimportant, may be represented by a single specification in which the operative positions of the two relevant fingers is given and, within the same string, "wild cards" or generic "ignore these" indicators are listed for the other fingers.

All of the innovations described here for gesture recognition, including but not limited to the multi-layered specification technique, use of relative orientations, quantization of data, and allowance for partial or minimal specification at every level, generalize beyond specification of hand gestures to specification of gestures using other body parts and "manufactured" tools and objects.

The programmatic techniques for "registering gestures" (2), consist of a defined set of Application Programming Interface calls that allow a programmer to define which gestures the engine should make available to other parts of the running system.

These API routines may be used at application set-up time, creating a static interface definition that is used throughout the lifetime of the running application. They may also be used during the course of the run, allowing the interface characteristics to change on the fly. This real-time alteration of the interface makes it possible to, i) build complex contextual and conditional control states, ii) to dynamically add hysterisis to the control environment, and iii) to create applications in which the user is able to alter or extend the interface vocabulary of the running system itself.

Algorithms for parsing the gesture stream (3) compare gestures specified as in (1) and registered as in (2) against incoming low-level gesture data. When a match for a registered gesture is recognized, event data representing the matched gesture is delivered up the stack to running applications.

Efficient real-time matching is desired in the design of this system, and specified gestures are treated as a tree of possibilities that are processed as quickly as possible.

In addition, the primitive comparison operators used internally to recognize specified gestures are also exposed for the applications programmer to use, so that further comparison (flexible state inspection in complex or compound gestures, for example) can happen even from within application contexts.

Recognition "locking" semantics are an innovation of the system described here. These semantics are implied by the registration API (2) (and, to a lesser extent, embedded within the specification vocabulary (1)). Registration API calls include, i) "entry" state notifiers and "continuation" state notifiers, and ii) gesture priority specifiers.

If a gesture has been recognized, its "continuation" conditions take precedence over all "entry" conditions for gestures of the same or lower priorities. This distinction between entry and continuation states adds significantly to perceived system usability.

The system described here includes algorithms for robust operation in the face of real-world data error and uncertainty. Data from low-level tracking systems may be incomplete (for a variety of reasons, including occlusion of markers in optical tracking, network drop-out or processing lag, etc).

Missing data is marked by the parsing system, and interpolated into either "last known" or "most likely" states, depending on the amount and context of the missing data.

If data about a particular gesture component (for example, the orientation of a particular joint) is missing, but the "last known" state of that particular component can be analyzed as physically possible, the system uses this last known state in its real-time matching.

Conversely, if the last known state is analyzed as physically impossible, the system falls back to a "best guess range" for the component, and uses this synthetic data in its real-time matching.

The specification and parsing systems described here have been carefully designed to support "handedness agnosticism," so that for multi-hand gestures either hand is permitted to satisfy pose requirements.

Coincident Virtual/Display and Physical Spaces

The system can provide an environment in which virtual space depicted on one or more display devices ("screens") is treated as coincident with the physical space inhabited by the operator or operators of the system. An embodiment of such an environment is described here. This current embodiment includes three projector-driven screens at fixed locations, is driven by a single desktop computer, and is controlled using the gestural vocabulary and interface system described herein. Note, however, that any number of screens are supported by the techniques being described; that those screens may be mobile (rather than fixed); that the screens may be driven by many independent computers simultaneously; and that the overall system can be controlled by any input device or technique.

The interface system described in this disclosure should have a means of determining the dimensions, orientations and positions of screens in physical space. Given this information, the system is able to dynamically map the physical space in which these screens are located (and which the operators of the system inhabit) as a projection into the virtual space of computer applications running on the system. As part of this automatic mapping, the system also translates the scale, angles, depth, dimensions and other spatial characteristics of the two spaces in a variety of ways, according to the needs of the applications that are hosted by the system.

This continuous translation between physical and virtual space makes possible the consistent and pervasive use of a number of interface techniques that are difficult to achieve on existing application platforms or that must be implemented piece-meal for each application running on existing platforms. These techniques include (but are not limited to):

1) Use of "literal pointing"—using the hands in a gestural interface environment, or using physical pointing tools or devices—as a pervasive and natural interface technique.

2) Automatic compensation for movement or repositioning of screens.

3) Graphics rendering that changes depending on operator position, for example simulating parallax shifts to enhance depth perception.

4) Inclusion of physical objects in on-screen display—taking into account real-world position, orientation, state, etc. For example, an operator standing in front of a large, opaque screen, could see both applications graphics and a representation of the true position of a scale model that is behind the screen (and is, perhaps, moving or changing orientation).

It is important to note that literal pointing is different from the abstract pointing used in mouse-based windowing interfaces and most other contemporary systems. In those systems, the operator must learn to manage a translation between a virtual pointer and a physical pointing device, and must map between the two cognitively.

By contrast, in the systems described in this disclosure, there is no difference between virtual and physical space (except that virtual space is more amenable to mathematical manipulation), either from an application or user perspective, so there is no cognitive translation required of the operator.

The closest analogy for the literal pointing provided by the embodiment described here is the touch-sensitive screen (as found, for example, on many ATM machines). A touch-sensitive screen provides a one to one mapping between the two-dimensional display space on the screen and the two-dimensional input space of the screen surface. In an analogous fashion, the systems described here provide a flexible mapping (possibly, but not necessarily, one to one) between a virtual space displayed on one or more screens and the physical space inhabited by the operator. Despite the usefulness of the analogy, it is worth understanding that the extension of this "mapping approach" to three dimensions, an arbitrarialy large architectural environment, and multiple screens is non-trivial.

In addition to the components described herein, the system may also implement algorithms implementing a continuous, systems-level mapping (perhaps modified by rotation, translation, scaling or other geometrical transformations) between the physical space of the environment and the display space on each screen.

A rendering stack which takes the computational objects and the mapping and outputs a graphical representation of the virtual space.

An input events processing stack which takes event data from a control system (in the current embodiment both gestural and pointing data from the system and mouse input) and maps spatial data from input events to coordinates in virtual space. Translated events are then delivered to running applications.

A "glue layer" allowing the system to host applications running across several computers on a local area network.

Figure 9:
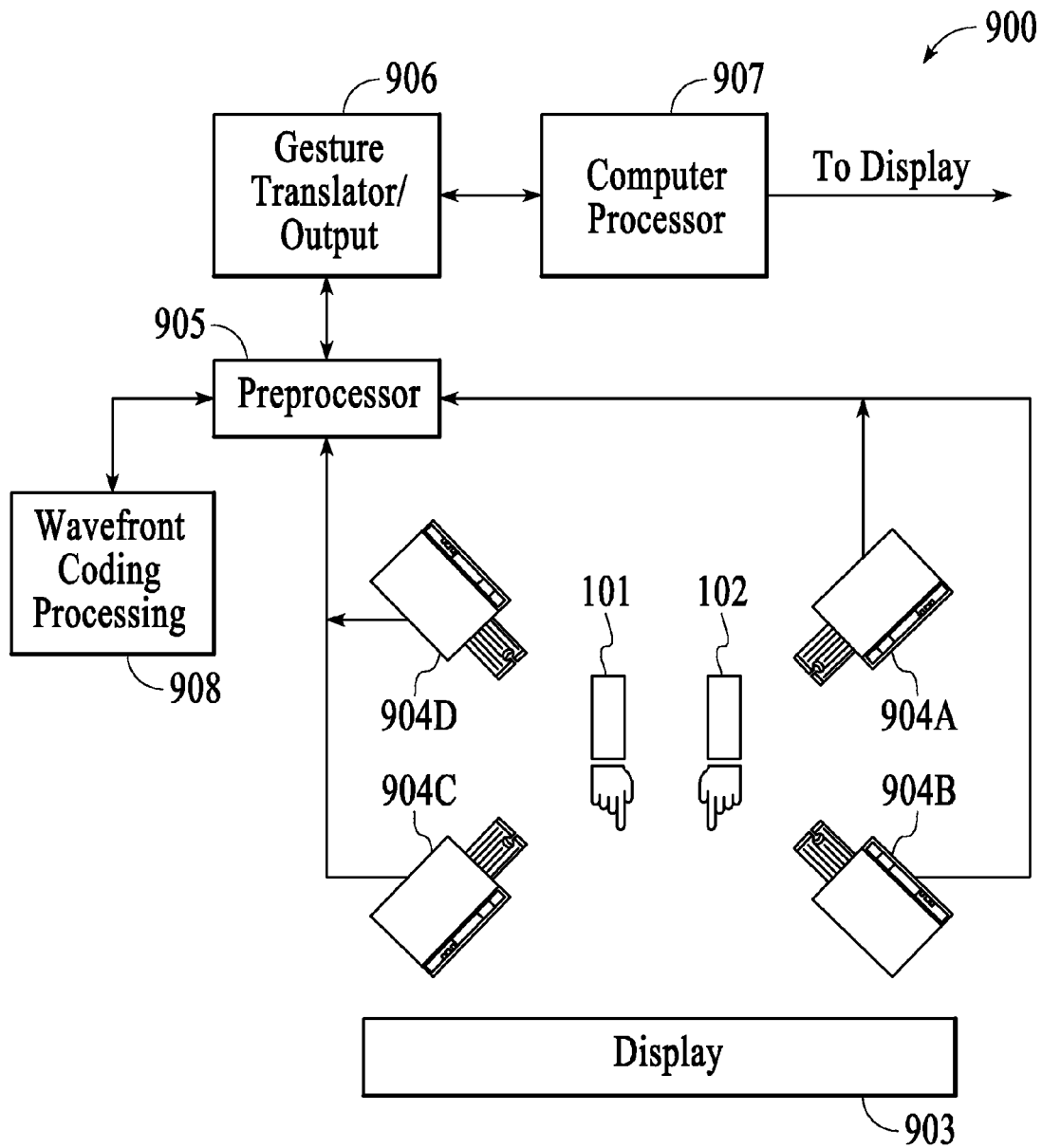
FIG. 9 is a block diagram of gesture-based control system for extracting three-dimensional information over an extended depth of field, under an embodiment.

Gesture-Based Control Using Three-Dimensional Information Extracted Over an Extended Depth of Field FIG. 9 is a block diagram of gesture-based control system 900 including an imaging system that extracts three-dimensional information over an extended depth of field, under an embodiment. A user locates his hands 101 and 102 in the viewing area of an array of cameras 904A-904D. At least two cameras of the array 904A-904D are wavefront coding cameras, each of which comprise elements of a wavefront coding imaging system including wavefront coding masks (also referred to herein as "optical aspheric element" or "optical element"), as described in detail below. The user's hands and/or fingers may or may not include the marker tags described above.

The cameras 904A-904D detect or capture images of the fingers and hands 101 and 102 including location, orientation, and movement of the fingers and hands 101 and 102 and generate output signals to pre-processor 905. Pre-processor 905 can include or be coupled to the wavefront coding digital signal processing 908, as described below. Alternatively, the wavefront coding digital signal processing can be included in, coupled to, or distributed among one or more other components of the system 900. The wavefront coding digital signal processing 908 is configured to vastly extend the depth of field of imaging systems.

Pre-processor 905 translates the camera output into a gesture signal that is provided to the computer processing unit 907 of the system. In so doing, the pre-processor 905 generates three dimensional space point reconstruction and skeletal point labeling. The gesture translator 906 converts the 3D spatial information and marker motion information into a command language that can be interpreted by a computer processor to update the location, shape, and action of a cursor on a display. The computer 907 uses the input information to generate a command to control one or more on screen cursors and provides video output to display 903.

One or more of the pre-processor 905, gesture translator 906, and computer 907 of an alternative embodiment can be combined into a single device. Regardless of system configuration, the functions and/or functionality of each of the pre-processor 905, gesture translator 906, and computer 907 are as described above with reference to FIGS. 1-8 and elsewhere herein.

Furthermore, while this example shows four cameras being used to detect the location, orientation, and movement of the user's hands 101 and 102, the embodiment is not so limited. The system configuration can include two or more cameras as appropriate to a system or workstation configuration. In addition, although the cameras are disposed symmetrically in the example embodiment, there is no requirement of such symmetry. Thus, at least two cameras with any positioning that permits the location, orientation, and movement of the user's hands may be used hereunder.

Although the system is shown with a single user's hands as input, the system can track hands of any number of multiple users. In addition, instead of or in addition to hands, the system may track any part or parts of a user's body, including head, feet, legs, arms, elbows, knees, and the like. Furthermore, the system can track any number of animate or inanimate objects and is not limited to tracking parts of a body.

In particular, for gesture analysis systems that locate an optical sensor so as to be deliberately or potentially proximal to an operator's hand (or equivalently tracked implement), the elements thus apprehended will typically range, throughout a natural sequence of operator motion, over several or many orders of relative distance magnitude. It is beyond the capacity of traditional optical imaging systems to provide a consistently focus-resolved record of events traversing such a range of distances. These close-approach to medium-distance geometries are often however desirable in the context of object- or operator-tracking for the purposes of macroscopic device and product design. It is thus of value to provide a technique (for which purpose traditional optics is inadequate) for insuring local contrast or salient feature stability over the expected range of operator activity.

In describing the extraction of three-dimensional information over an extended depth of field as used in the systems herein, distance to a point in a scene can be estimated from its location in two or more images captured simultaneously. The three dimensional (3D) position of the point can be computed from basic geometric relationships when the 3D relationship between the imagers is known. The challenge in computing spatial location from multiple images, often referred to as stereo correlation or stereo depth computation, is automatically and accurately associating the mapping of a point in one image with its mapping in another image. This is most often done by correlating image features from one image to one or more others. The underlying assumption in all stereo matching methods, however, is that there must be some identifiable local contrast or feature in the image in order to match that point to its location in another image. Therefore a problem arises when there is no local contrast or feature in the image because of misfocus—stereo matching does not produce accurate results in regions of an image that are out of focus.

The conventional means for extending the focal depth of an image is to reduce the diameter of the camera's lens's pupil ("stopping down"). However, two side effects restrict the usefulness of the technique. First, the sensitivity of the imaging system is reduced by a factor equal to the square of the pupil diameter ratio. Second, the maximum spatial frequency response is reduced a factor equal to the pupil diameter ratio, which limits the resolution and contrast in the image. There is thus a tradeoff between depth of field, exposure time, and overall contrast in conventional imaging systems. In the case of a multiple camera ranging system, the net effect will be a compromise between stereoscopic depth accuracy and working range.

An alternate approach to increasing depth of field without stopping the lens is to introduce a phase mask of specified prescription in the pupil of the camera lens. With a properly chosen phase function, an extended depth of field can be recovered by subsequent electronic processing of the image captured on the sensor. This technique, known as wavefront coding, generally provides a tradeoff among depth of field, camera dynamic range, and signal-to-noise ratio. Wavefront coding makes it possible to optimize the camera parameters for a specific application. Applications that do not require a very high dynamic range and in which the illumination is under user control, such as gesture recognition described herein, can greatly benefit from wavefront coding to achieve a high accuracy over a prescribed volume of space.

As described above, the system of an embodiment includes a technique in which the processed outputs of a plurality of wavefront coding cameras are used to determine the range and position of selected objects within a scene. The extended depth of field that results from wavefront coding can be used in a number of applications, including gesture recognition and a broad array of other task-based imaging work, to significantly increase their performance. Although a minimum of two cameras is required, there is no upper limit to the number of cameras that can be used in the embodiment. The scene extraction can include any of a plurality of processing techniques (such as correlations) that are used for range extraction with two or more cameras. The embodiments described herein include all wavefront coding phase functions, and their corresponding decoding kernels, that result in an extended depth of field after processing.

Wavefront coding, as used in wavefront coding imaging systems, is a general technique of using generalized aspheric optics and digital signal processing to greatly increase the performance and/or reduce the cost of imaging systems. The type of aspheric optics employed results in optical imaging characteristics that are very insensitive to misfocus related aberrations. A sharp and clear image is not directly produced from the optics, however, digital signal processing applied to the sampled image produces a sharp and clear final image that is also insensitive to misfocus related aberrations.

Wavefront coding is used to greatly increase imaging performance while also reducing the size, weight, and cost of imaging systems. Wavefront coding combines non-rotationally symmetric aspheric optical elements and digital signal processing in a fundamental manner to vastly extend the depth of field of imaging systems. With wavefront coding the depth of field or depth of focus of an imaging system can be increased by a factor of ten or more compared to traditional imaging systems, for a given aperture size or F/#, for example. Wavefront coding optical elements of an embodiment are phase surfaces and as such do not absorb light or increase exposure or illumination requirements. Such extended depth of field performance is impossible with traditional imaging techniques without dramatic loss of optical power, such as required with stopped down apertures. Increased depth of field/depth of focus also enables imaging systems to be physically less expensive, smaller, or lighter by controlling misfocus related aberrations that are traditionally controlled by adding lens elements or increasing lens complexity. Misfocus related aberrations that can be controlled with wavefront coding include chromatic aberration, Petzval curvature, astigmatism, spherical aberration, and temperature related misfocus.

Figure 10:
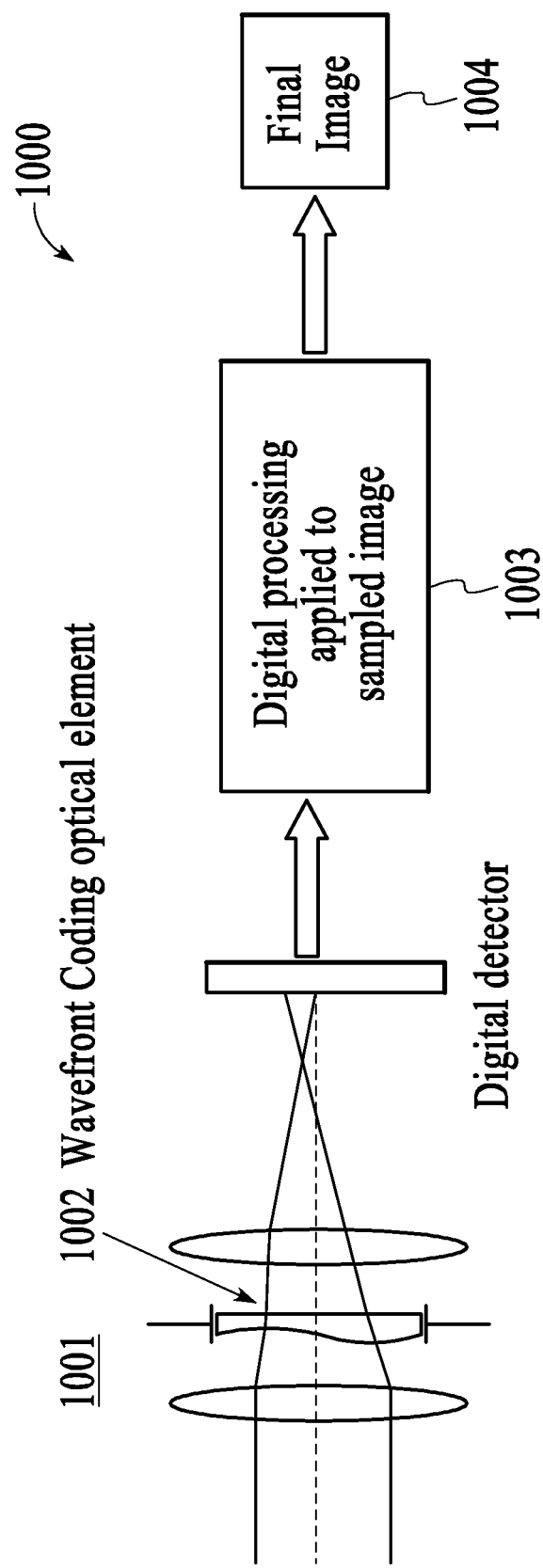
FIG. 10 is a block diagram of a wavefront coding imaging system used in a gesture-based control system, under an embodiment.

Wavefront coding, as a hybrid imaging approach, combines optics and electronics to increase depth of field and reduce the number of optical elements, fabrication tolerances, and overall system cost. FIG. 10 is a block diagram of a wavefront coding imaging system 1000 used in a gesture-based control system, under an embodiment. The optical section 1001 of the wavefront coding imaging system 1000 is a conventional optical system or camera modified with a wavefront coding optical element 1002 placed near the aperture stop. The addition of the coding optical element results in images with a specialized well-defined blur or point spread function that is insensitive to misfocus. Digital processing 1003 applied to the sampled image produces a sharp and clear image 1004 that is very insensitive to misfocus effects.

Figure 11:
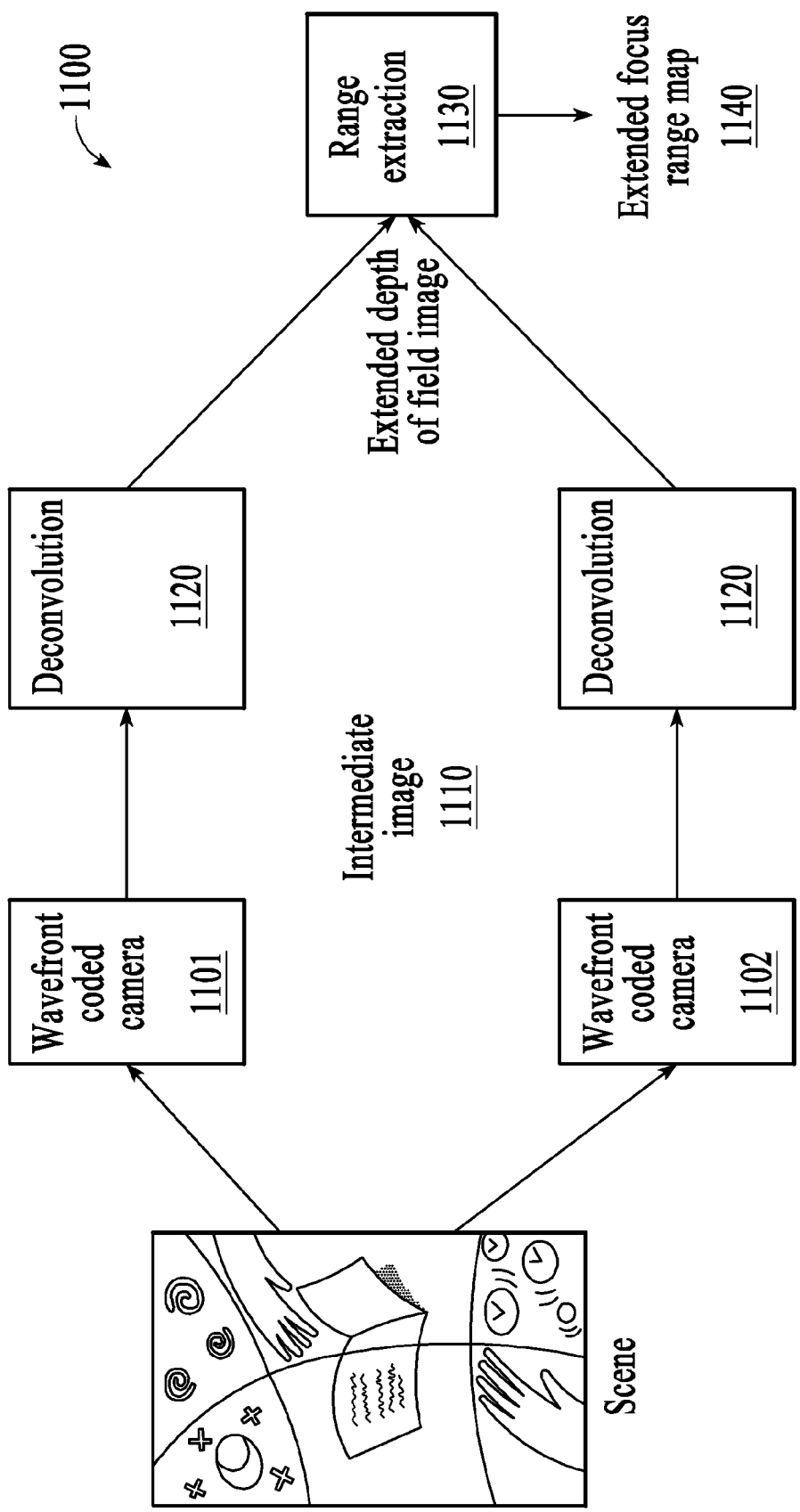
FIG. 11 is a block diagram of gesture-based control system for extracting three-dimensional information over an extended depth of field using a wavefront coding imaging system that includes two wavefront coding cameras, under an embodiment.

FIG. 11 is a block diagram of gesture-based control system 1100 for extracting three-dimensional information over an extended depth of field using a wavefront coding imaging system that includes two wavefront coding cameras, under an embodiment. The system 1100 includes at least two wavefront coding cameras 1101 and 1102, as described above with reference to FIG. 10. A processor is coupled to receive the output of the wavefront coding cameras 1101 and 1102 and to perform data processing on the camera output. The data processing includes deconvolution 1120 and range extraction 1130, to name a few, and generate an extended focus range map 1140.

In the wavefront coding system 1100, the optical portion of the system (e.g., wavefront coding cameras 1101 and 1102) "codes" the resulting images to produce intermediate images 1110. Because the wavefront coding element (e.g., FIG. 10, element 1002) purposefully blurs all points in any image, the intermediate image 1110 appears misfocused. In such intermediate images 1110, nearly all the objects within the field of view are blurred, but they are blurred identically. In contrast, traditional optics typically form images that have a variable blur function that is dependent on the distance to each object in the scene.

In order to produce a sharp and clear image from the intermediate wavefront-coded image 1110, electronics (e.g., wavefront coding digital signal processing) are used to process or "decode" 1120 and 1130 the blurred intermediate image by removing the system-dependent image blur. The digital filtering can be performed in real-time by software or with specialized hardware solutions.

The system optics of an embodiment include conventional components with at least one additional optical element that performs the wavefront coding function, as described above with reference to FIG. 10. This element is placed in the optical path, typically near an aperture stop of the system to minimize vignetting. The signal processing performed on the detected image depends on the optics, wavefront coding element, and the first-order properties of the digital detector.

The general wavefront coding element is nonrotationally symmetric and smooth, although diffractive surfaces can be used. The element can be a separate component, or it can be integrated onto a traditional lens element by the addition of a generalized aspheric surface. All coding elements redirect light so that no ray, besides the on-axis ray, travels toward the traditional geometric focus point. In fact, no two rays are traveling toward the same point along the optical axis. The system does not form a clear image at any image plane.

The main effect of the optics portion of a wavefront-coded imaging system is to make the resulting images insensitive to focus-related aberrations such as defocus, spherical aberration, astigmatism, or field curvature. The intermediate blurry image is insensitive or invariant to changes in the object or imaging system that consist of defocus aberrations. From a systems analysis point of view, the modulation transfer functions (MTFs) and point spread functions (PSFs) of wavefront-coded systems are invariant with respect to defocus.

Although the MTF of an intermediate image from a wavefront-coded system shows little change with defocus, such MTFs do have reduced power compared with the in-focus traditional system. Since apodization is not used, total optical power is preserved. A digital filtering or image reconstruction process is used to form a clear image. These final MTFs are very insensitive to defocus—thus, the wavefront-coded imaging system has a very large depth of field. Similarly, the intermediate PSFs from the wavefront-coded system are different from traditional system PSFs, but they change very little with changes in misfocus.

Referring again to FIG. 10, a special purpose optical aspheric element is placed at or near the aperture stop of a conventional imaging system to form a wavefront coding imaging system. This optical element modifies the imaging system in such a way that the resulting PSF and optical transfer function (OTF) are insensitive to a range of misfocus or misfocus-related aberrations. The PSF and OTF are not, however, the same as that obtained with a good quality infocus imaging system. The process of making the imaging system insensitive to misfocus aberrations produces images with a specialized, well defined blur; this blur is removed with the wavefront coding digital signal processing.

The PSFs from a conventional imaging system, for example, change drastically with misfocus, while the PSFs from the wavefront coding imaging system show almost no noticeable change with misfocus. Digital processing to remove the misfocus blur applied to a misfocused traditional imaging system uses processing dependent on the amount of misfocus present in different areas of the image. In many situations the amount of misfocus is unknown and difficult to calculate. In addition, the MTF of the misfocused traditional imaging system can often contain zeros or nulls that further increase the difficulty of the digital processing. In contrast, the constant nature of PSFs with misfocus from the wavefront coding system is what is needed to eliminate the dependencies of digital processing on misfocus. Digital processing applied to the charge-coupled device (CCD) or complementary metal-oxide-semiconductor (CMOS)—detected image is independent of misfocus and the actual scene being imaged. In addition, the MTF of wavefront coding imaging systems, both in and out of focus, contain no zeros or nulls allowing high quality final images.

Wavefront coding for extending the depth of field can add value to imaging applications where traditional methodologies (i.e. stopping down the aperture) are generally unacceptable. Constraints on illumination levels, exposure times, or spatial resolution often limit the application of previous optical methods. By using wavefront coding, applications can enjoy fewer misfocus-related problems, without sacrificing exposure times or requiring vast quantities of illumination Wavefront coding imaging systems comprise non-conventional optical designs and digital signal processing of the resulting images, as described above. The signal processing used is dependent on the specific optical system. The wavefront coding optics are dependent on the type and amount of signal processing to be used. Since the optics and signal processing are closely coupled, it is natural to expect best performance from systems where the optical and digital components of the system are jointly optimized during design. The optical components are configured to minimize the changes or sensitivity of the optics to misfocus effects as well enable efficient signal processing. The digital components are designed to minimize algorithm complexity, processing time, and effects of digital processing on image noise.

Figure 12:
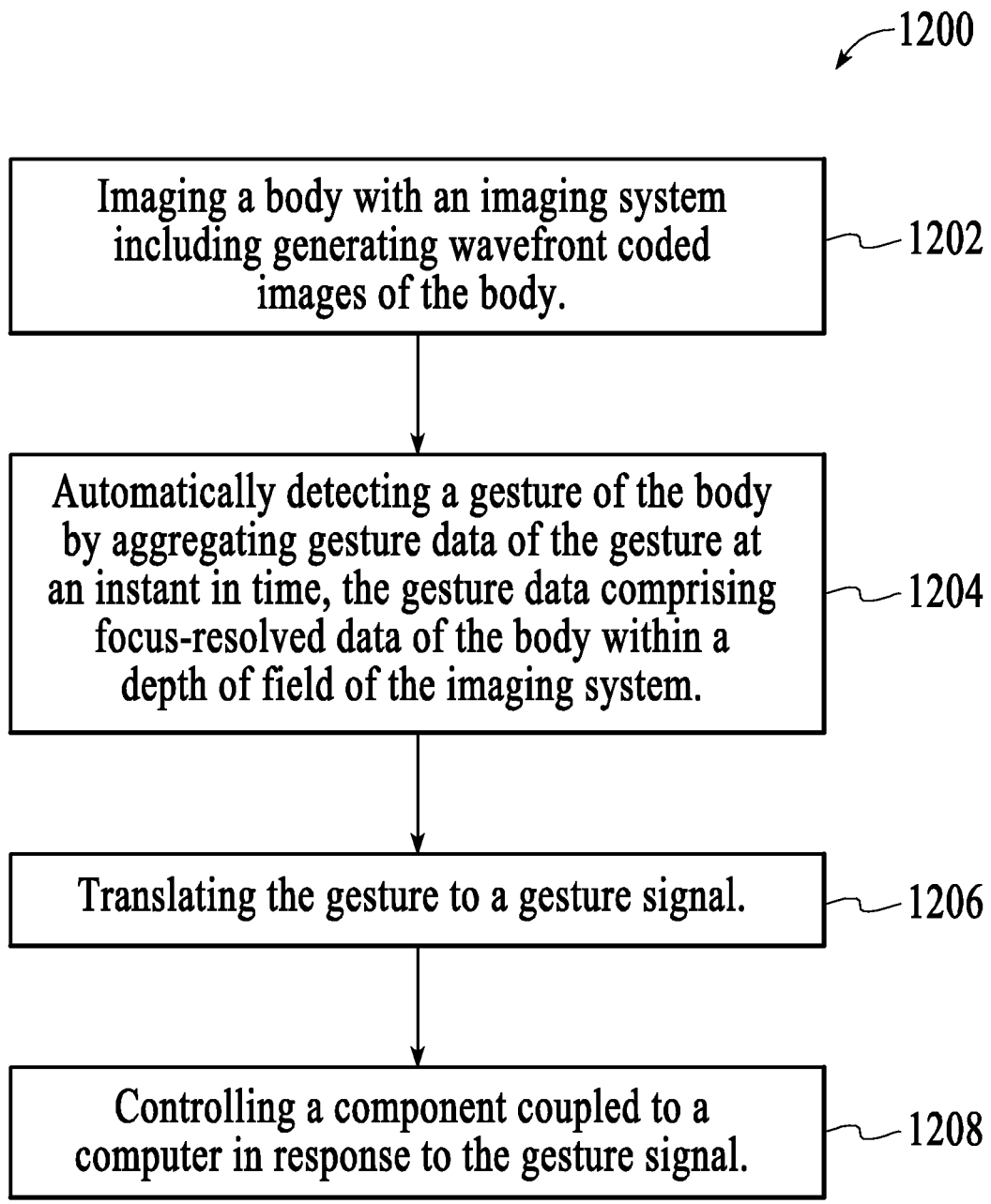
FIG. 12 is a flow diagram for gesture-based control using three-dimensional information extracted over an extended depth of field, under an embodiment.

FIG. 12 is a flow diagram for gesture-based control using three-dimensional information extracted over an extended depth of field, under an embodiment. The gesture-based control of an embodiment comprises imaging 1202 a body with an imaging system. The imaging 1202 comprises generating wavefront coded images of the body. The gesture-based control of an embodiment comprises automatically detecting 1204 a gesture of a body, the gesture including an instantaneous state of the body. The detecting 1204 includes aggregating gesture data of the gesture at an instant in time. The gesture data comprises focus-resolved data of the body within a depth of field of the imaging system. The gesture-based control of an embodiment comprises translating 1206 the gesture to a gesture signal. The gesture-based control of an embodiment comprises controlling 1208 a component coupled to a computer in response to the gesture signal.

Figure 13:
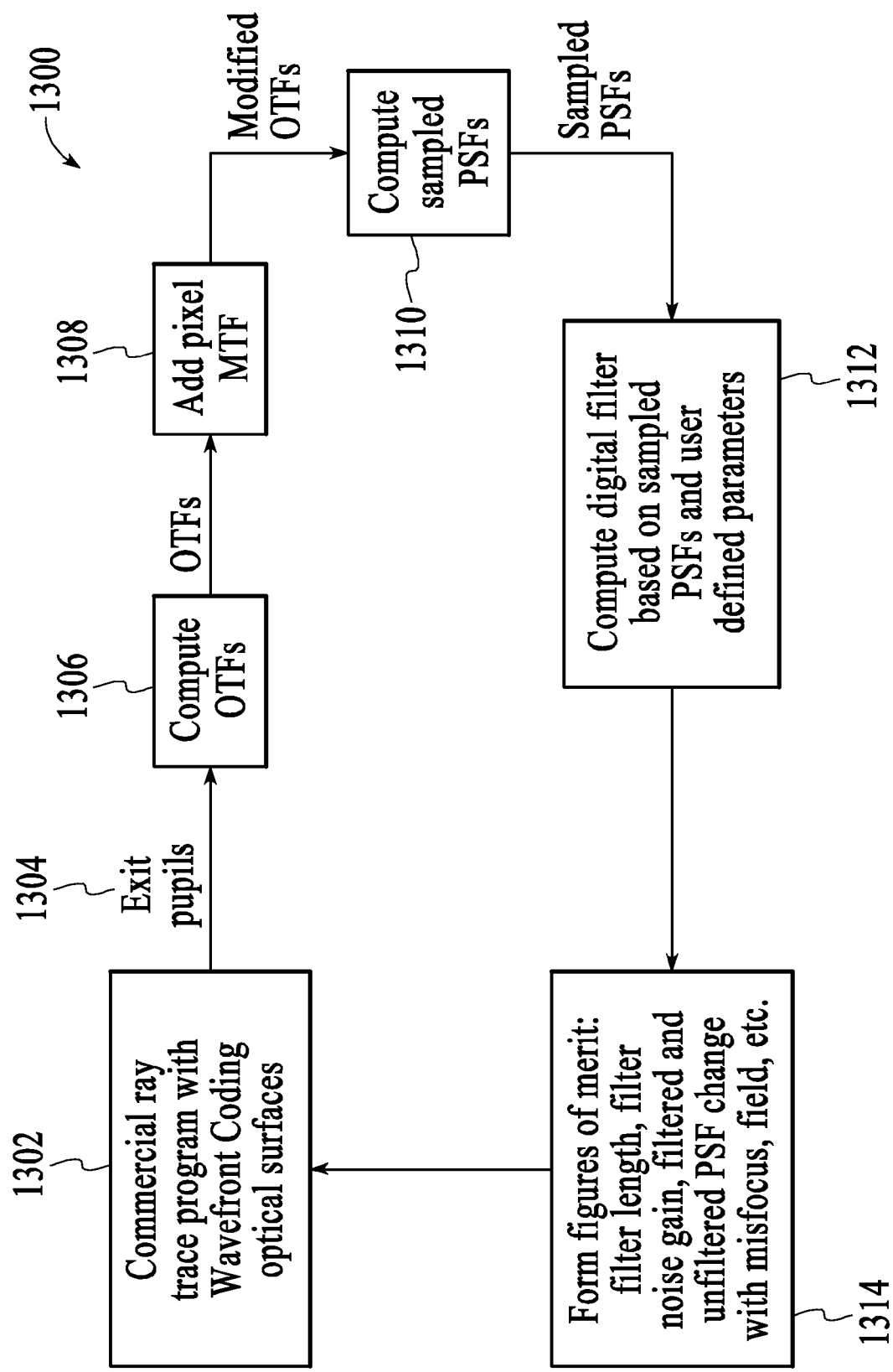
FIG. 13 is a block diagram of a wavefront coding design process used in a gesture-based control system, under an embodiment.

The base routine for wavefront coding of an embodiment can include a ray-trace program that traces rays through typical spherical and aspherical surfaces as well as general wavefront coding surface forms. The ray-trace program is used to calculate exit pupils and optimize a given set of optical and digital merit functions or operands. FIG. 13 is a block diagram of a wavefront coding design process 1300 used in a gesture-based control system, under an embodiment. The output of this design includes but is not limited to the following: traditional optical surfaces, materials, thickness, and spacings; parameters of wavefront coding surfaces; and, digital filter coefficients.

The general optical/digital design loop is now described with reference to FIG. 13. A ray-trace program 1302 traces rays through optical surfaces to calculate exit pupil optical path differences (OPDs) 1304 and optimize a given set of optical and digital merit functions or operands. Inputs to the ray-trace program 1302 include optical surfaces, thickness, and operating conditions (wavelengths, field of view, temperature range, sample object images, etc.) to name a few. The OTFs are calculated or generated 1306, and pixel OTFs related to detector geometry are added 1308. Sampled OTFs and PSFs are calculated 1310. Digital filter coefficients are generated 1312 for a selected processing algorithm based on the sampled PSFs. The processing continues by forming figures of merit (e.g., wavefront coding operands) for the filter that are based on minimizing: changes of the sampled PSF and MTF through focus, with field angle, with color, due to temperature changes, due to aliasing, etc.; digital processing parameters such as amount of processing, form of the processing, processing related image noise, digital filter noise gain etc. The wavefront coding operands are combined with traditional optical operands (Seidel Wavefront aberrations, RMS Wavefront errors, etc.) through optimization routines to modify the optical surfaces. Operations return to generate 1302 exit pupil optical path differences (OPDs) via traditional ray tracing.

Theoretically calculated wavefront coding surface forms are used as starting points for the optical optimization. One general family of rectangularly separable surface forms is given in normalized coordinates as:

$$S(x) = |\beta| \operatorname{sign}(x) |x|^{\alpha}$$

where $\operatorname{sign}(x) = +1$ for $x > 0$,
and $\operatorname{sign}(x) = -1$ for $x \leq 0$.

The exponential parameter a controls the height of the MTF over a range of misfocus, and the parameter $\beta$ controls the sensitivity to misfocus. In general, increasing the parameter $\beta$ decreases the sensitivity to misfocus while decreasing the height of the MTF and increasing the length of the resulting PSF.

The filtering process used to reconstruct the intermediate images and produce final images can impose a computational burden. The size of the filter kernel required for image reconstruction may be as large as 70×70 coefficients, depending on the optical system and the enhancement to depth-of-field introduced by the coding process. Generally, the larger the depth of field extension, the larger the filter kernel, and the larger the noise penalty or noise gain. Furthermore, because every pixel in an image is blurred by wavefront coding, every pixel needs to be filtered; thus, larger images can require more computation than smaller images. With image sizes approaching tens of millions of pixels, efficient computational solutions are used for practical and economical systems. Computational implementations, such as rectangularly separable filter approximations, can help reduce kernel dimensions. The wavefront coding element used, for example, can have a rectangularly separable cubic phase form described as $$S(x,y)=\alpha(x^3+y^3).$$

Filtering a blurred image to remove the blur essentially imposes an amplification and phase shift as a function of spatial frequency. This amplification increases the signal as well as the noise in the final images. For very large depth-of-field enhancements, for instance, over 10 times, the noise gain in a wavefront-coded system can be a factor of four or five. For more moderate depth-of-field enhancements of two to four, the noise gain is typically a factor of two or less.

For uncorrelated Gaussian noise (a good assumption for most images) the noise gain is the RMS value of the filter coefficients. For systems with depth-of-field extensions too large to produce a suitably small noise-gain value, reducing the resolution or spatial bandwidth of the digital filter can reduce the noise gain. Reducing the contrast in the final image also can reduce the overall effects of the increased noise. Specialized nonlinear filtering is the best solution for removing noise in wavefront-coded images.

Because the wavefront coding optical element used to form the MTFs and PSFs in an embodiment is rectangularly separable, the signal processing used may also be rectangularly separable. Rectangularly separable processing can reduce the required number of computations by an order of magnitude or more. Due to the fact that the digital filtering is performed with spatial convolution, the computational methods of an embodiment comprise a series of multiplications to scale the data by the filter coefficients and summations to add all the scaled data values together across the entire kernel. The fundamental unit of such a computation is a multiply-accumulate operation. A typical 2-D wavefront coding filter kernel for a large depth-of-field increase might be 30×30 coefficients. A rectangularly separable version of this filter would contain a row filter that is 30 coefficients long and a column filter that is 30 coefficients tall, or 60 total coefficients. While wavefront coding elements can be rectangulalry separable in design, they are not so limited, and highly aberrated systems may use nonseparable filtering.

By combining optical imaging techniques with electronic filtering, wavefront coding technology can improve performance for a wide range of imaging systems. The performance gains in high-performance imaging systems can include very large depth-of-field without sacrificing light gathering or spatial resolution. The performance gains in lower-cost imaging systems can include good image quality with fewer physical components than traditionally required.

The embodiments described herein include a system comprising: a plurality of optical detectors, wherein at least two optical detectors of the plurality of optical detectors comprise wavefront coding or coded cameras, wherein the plurality of optical detectors image a body; and a processor coupled to the plurality of optical detectors, the processor automatically detecting a gesture of a body, wherein the gesture comprises an instantaneous state of the body, wherein the detecting comprises aggregating gesture data of the gesture at an instant in time, the gesture data comprising focus-resolved data of the body within a depth of field of the imaging system, the processor translating the gesture to a gesture signal and using the gesture signal to control a component coupled to the processor.

The wavefront coding cameras of an embodiment include a wavefront coding optical element.

The imaging of an embodiment comprises generating wavefront coded images of the body.

The wavefront coding cameras of an embodiment include a phase mask that increases a depth of focus of the imaging.

The gesture data of an embodiment comprises focus-resolved range data of the body within the depth of field.

The focus-resolved range data of the body within the depth of field of an embodiment is derived from an output of the wavefront coding cameras.

The gesture data of an embodiment comprises focus-resolved position data of the body within the depth of field.

The focus-resolved position data of the body within the depth of field of an embodiment is derived from an output of the wavefront coding cameras.

The system of an embodiment comprises modulation transfer functions and point spread functions that are invariant to a distance between the body and the imaging system.

The system of an embodiment comprises modulation transfer functions and point spread functions that are invariant with respect to defocus.

The processor of an embodiment generates intermediate images by coding images gathered by the wavefront coding cameras.

The intermediate images of an embodiment are blurred.

The intermediate images of an embodiment are insensitive to changes in the body or the plurality of optical detectors that include defocus aberrations.

The gesture data of an embodiment is three-space location data representing the gesture.

The detecting of an embodiment includes at least one of detecting a location of the body, detecting an orientation of the body, and detecting includes detecting motion of the body.

The detecting of an embodiment comprises identifying the gesture, wherein the identifying includes identifying a pose and an orientation of a portion of the body.

The detecting of an embodiment includes detecting at least one of a first set of appendages and a second set of appendages of the body.

The detecting of an embodiment includes dynamically detecting a position of at least one tag.

The detecting of an embodiment includes detecting position of a set of tags coupled to a part of the body.

Each tag of the set of tags of an embodiment includes a pattern, wherein each pattern of each tag of the set of tags is different than any pattern of any remaining tag of the plurality of tags.

The detecting of an embodiment includes dynamically detecting and locating a marker on the body.

The detecting of an embodiment includes detecting position of a set of markers coupled to a part of the body.

The set of markers of an embodiment form a plurality of patterns on the body.

The detecting of an embodiment includes detecting position of a plurality of appendages of the body using a set of markers coupled to each of the appendages.

The translating of an embodiment comprises translating information of the gesture to a gesture notation.

The gesture notation of an embodiment represents a gesture vocabulary, and the gesture signal comprises communications of the gesture vocabulary.

The gesture vocabulary of an embodiment represents in textual form instantaneous pose states of kinematic linkages of the body.

The gesture vocabulary of an embodiment represents in textual form an orientation of kinematic linkages of the body.

The gesture vocabulary of an embodiment represents in textual form a combination of orientations of kinematic linkages of the body.

The gesture vocabulary of an embodiment includes a string of characters that represent a state of kinematic linkages of the body.

The kinematic linkage of an embodiment is at least one first appendage of the body.

The system of an embodiment comprises assigning each position in the string to a second appendage, the second appendage connected to the first appendage.

The system of an embodiment comprises assigning characters of a plurality of characters to each of a plurality of positions of the second appendage.

The plurality of positions of an embodiment is established relative to a coordinate origin.

The system of an embodiment comprises establishing the coordinate origin using a position selected from a group consisting of an absolute position and orientation in space, a fixed position and orientation relative to the body irrespective of an overall position and heading of the body, and interactively in response to an action of the body.

The system of an embodiment comprises assigning characters of the plurality of characters to each of a plurality of orientations of the first appendage.

The detecting of an embodiment comprises detecting when an extrapolated position of the body intersects virtual space, wherein the virtual space comprises space depicted on a display device coupled to the computer.

Controlling the component of an embodiment comprises controlling a virtual object in the virtual space when the extrapolated position intersects the virtual object.

Controlling the component of an embodiment comprises controlling a position of the virtual object in the virtual space in response to the extrapolated position in the virtual space.

Controlling the component of an embodiment comprises controlling attitude of the virtual object in the virtual space in response to the gesture.

The system of an embodiment comprises controlling scaling of the detecting and controlling to generate coincidence between virtual space and physical space, wherein the virtual space comprises space depicted on a display device coupled to the processor, wherein the physical space comprises space inhabited by the body.

The system of an embodiment comprises controlling at least one virtual object in the virtual space in response to movement of at least one physical object in the physical space.

The controlling of an embodiment includes at least one of controlling a function of an application hosted on the processor and controlling a component displayed on the processor.

The embodiments described herein include a method comprising: imaging a body with an imaging system, the imaging comprising generating wavefront coded images of the body; automatically detecting a gesture of a body, wherein the gesture comprises an instantaneous state of the body, wherein the detecting comprises aggregating gesture data of the gesture at an instant in time, the gesture data comprising focus-resolved data of the body within a depth of field of the imaging system; translating the gesture to a gesture signal; and controlling a component coupled to a computer in response to the gesture signal.

The imaging system of an embodiment comprises a plurality of optical detectors, wherein at least two of the optical detectors are wavefront coding cameras comprising a wavefront coding optical element.

The imaging of an embodiment comprises generating wavefront coded images of the body.

The imaging system of an embodiment comprises a plurality of optical detectors, wherein at least two of the optical detectors are wavefront coding cameras comprising a phase mask that increases a depth of focus of the imaging.

The gesture data of an embodiment comprises focus-resolved range data of the body within the depth of field.

The focus-resolved range data of the body within the depth of field of an embodiment is derived from an output of the imaging system.

The gesture data of an embodiment comprises focus-resolved position data of the body within the depth of field.

The focus-resolved position data of the body within the depth of field of an embodiment is derived from an output of the imaging system.

The method of an embodiment comprises generating modulation transfer functions and point spread functions that are invariant to a distance between the body and the imaging system.

The method of an embodiment comprises generating modulation transfer functions and point spread functions that are invariant with respect to defocus.

The method of an embodiment comprises generating intermediate images by coding images gathered by the wavefront coding cameras.

The intermediate images of an embodiment are blurred.

The intermediate images of an embodiment are insensitive to changes in the body or a plurality of optical detectors of the imaging system that include defocus aberrations.

The gesture data of an embodiment is three-space location data representing the gesture.

The detecting of an embodiment includes detecting a location of the body.

The detecting of an embodiment includes detecting an orientation of the body.

The detecting of an embodiment includes detecting motion of the body.

The detecting of an embodiment comprises identifying the gesture, wherein the identifying includes identifying a pose and an orientation of a portion of the body.

The detecting of an embodiment includes detecting at least one of a first set of appendages and a second set of appendages of the body.

The detecting of an embodiment includes dynamically detecting a position of at least one tag.

The detecting of an embodiment includes detecting position of a set of tags coupled to a part of the body.

Each tag of the set of tags of an embodiment includes a pattern, wherein each pattern of each tag of the set of tags is different than any pattern of any remaining tag of the plurality of tags.

The detecting of an embodiment includes dynamically detecting and locating a marker on the body.

The detecting of an embodiment includes detecting position of a set of markers coupled to a part of the body.

The set of markers of an embodiment form a plurality of patterns on the body.

The detecting of an embodiment includes detecting position of a plurality of appendages of the body using a set of markers coupled to each of the appendages.

The translating of an embodiment comprises translating information of the gesture to a gesture notation.

The gesture notation of an embodiment represents a gesture vocabulary, and the gesture signal comprises communications of the gesture vocabulary.

The gesture vocabulary of an embodiment represents in textual form instantaneous pose states of kinematic linkages of the body.

The gesture vocabulary of an embodiment represents in textual form an orientation of kinematic linkages of the body.

The gesture vocabulary of an embodiment represents in textual form a combination of orientations of kinematic linkages of the body.

The gesture vocabulary of an embodiment includes a string of characters that represent a state of kinematic linkages of the body.

The kinematic linkage of an embodiment is at least one first appendage of the body.

The method of an embodiment comprises assigning each position in the string to a second appendage, the second appendage connected to the first appendage.

The method of an embodiment comprises assigning characters of a plurality of characters to each of a plurality of positions of the second appendage.

The plurality of positions of an embodiment is established relative to a coordinate origin.

The method of an embodiment comprises establishing the coordinate origin using a position selected from a group consisting of an absolute position and orientation in space, a fixed position and orientation relative to the body irrespective of an overall position and heading of the body, and interactively in response to an action of the body.

The method of an embodiment comprises assigning characters of the plurality of characters to each of a plurality of orientations of the first appendage.

The detecting of an embodiment comprises detecting when an extrapolated position of the body intersects virtual space, wherein the virtual space comprises space depicted on a display device coupled to the computer.

Controlling the component of an embodiment comprises controlling a virtual object in the virtual space when the extrapolated position intersects the virtual object.

Controlling the component of an embodiment comprises controlling a position of the virtual object in the virtual space in response to the extrapolated position in the virtual space.

Controlling the component of an embodiment comprises controlling attitude of the virtual object in the virtual space in response to the gesture.

The method of an embodiment comprises controlling scaling of the detecting and controlling to generate coincidence between virtual space and physical space, wherein the virtual space comprises space depicted on a display device coupled to the processor, wherein the physical space comprises space inhabited by the body.

The method of an embodiment comprises translating scale, angle, depth, and dimension between the virtual space and the physical space as appropriate to at least one application coupled to the processor.

The method of an embodiment comprises controlling at least one virtual object in the virtual space in response to movement of at least one physical object in the physical space.

The controlling of an embodiment includes controlling a function of an application hosted on the processor.

The controlling of an embodiment includes controlling a component displayed on the processor.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the processing environment is not intended to be exhaustive or to limit the systems and methods described to the precise form disclosed. While specific embodiments of, and examples for, the processing environment are described herein for illustrative purposes, various equivalent modifications are possible within the scope of other systems and methods, as those skilled in the relevant art will recognize. The teachings of the processing environment provided herein can be applied to other processing systems and methods, not only for the systems and methods described above.

The elements and acts of the various embodiments described above can be combined to provide further embodiments. These and other changes can be made to the processing environment in light of the above detailed description.

What is claimed is:

1. A system comprising:
a plurality of optical detectors, wherein at least two optical detectors of the plurality of optical detectors comprise wavefront coded cameras, wherein the plurality of optical detectors image a body; and
a processor coupled to the plurality of optical detectors, the processor automatically detecting a gesture of a body, wherein the gesture comprises an instantaneous state of the body, wherein the detecting comprises aggregating only gesture data of the gesture and precluding use of background data in the detecting of the gesture, the gesture data comprising absolute three-space focus-resolved location data of an instantaneous state of the body at a point in time and space, the processor translating the gesture to a gesture signal and using the gesture signal to control a component coupled to the processor.

2. The system of claim 1, wherein the wavefront coded cameras include a wavefront coding optical element.

3. The system of claim 1, wherein the imaging comprises generating wavefront coded images of the body.

4. The system of claim 1, wherein the wavefront coded cameras include a phase mask that increases a depth of focus of the imaging.

5. The system of claim 1, wherein the gesture data comprises focus-resolved range data of the body within the depth of field.

6. The system of claim 5, wherein the focus-resolved range data of the body within the depth of field is derived from an output of the wavefront coded cameras.

7. The system of claim 1, wherein the gesture data comprises focus-resolved position data of the body within the depth of field.

8. The system of claim 7, wherein the focus-resolved position data of the body within the depth of field is derived from an output of the wavefront coded cameras.

9. The system of claim 1, comprising modulation transfer functions and point spread functions that are invariant to a distance between the body and the imaging system.

10. The system of claim 1, comprising modulation transfer functions and point spread functions that are invariant with respect to defocus.

11. The system of claim 1, wherein the processor generates intermediate images by coding images gathered by the wavefront coded cameras.

12. The system of claim 11, wherein the intermediate images are blurred.

13. The system of claim 11, wherein the intermediate images are insensitive to changes in the body or the plurality of optical detectors that include defocus aberrations.

14. The system of claim 1, wherein the gesture data is three-space location data representing the gesture.

15. The system of claim 1, wherein the detecting includes at least one of detecting a location of the body, detecting an orientation of the body, and detecting includes detecting motion of the body.

16. The system of claim 1, wherein the detecting comprises identifying the gesture, wherein the identifying includes identifying a pose and an orientation of a portion of the body.

17. The system of claim 1, wherein the detecting includes detecting at least one of a first set of appendages and a second set of appendages of the body.

18. The system of claim 1, wherein the detecting includes dynamically detecting a position of at least one tag.

19. The system of claim 18, wherein the detecting includes detecting position of a set of tags coupled to a part of the body.

20. The system of claim 19, wherein each tag of the set of tags includes a pattern, wherein each pattern of each tag of the set of tags is different than any pattern of any remaining tag of the plurality of tags.

21. The system of claim 1, wherein the detecting includes dynamically detecting and locating a marker on the body.

22. The system of claim 21, wherein the detecting includes detecting position of a set of markers coupled to a part of the body.

23. The system of claim 21, wherein the set of markers form a plurality of patterns on the body.

24. The system of claim 21, wherein the detecting includes detecting position of a plurality of appendages of the body using a set of markers coupled to each of the appendages.

25. The system of claim 1, wherein the translating comprises translating information of the gesture to a gesture notation.

26. The system of claim 25, wherein the gesture notation represents a gesture vocabulary, and the gesture signal comprises communications of the gesture vocabulary.

27. The system of claim 26, wherein the gesture vocabulary represents in textual form instantaneous pose states of kinematic linkages of the body.

28. The system of claim 26, wherein the gesture vocabulary represents in textual form an orientation of kinematic linkages of the body.

29. The system of claim 26, wherein the gesture vocabulary represents in textual form a combination of orientations of kinematic linkages of the body.

30. The system of claim 26, wherein the gesture vocabulary includes a string of characters that represent a state of kinematic linkages of the body.

31. The system of claim 30, wherein the kinematic linkage is at least one first appendage of the body.

32. The system of claim 31, comprising assigning each position in the string to a second appendage, the second appendage connected to the first appendage.

33. The system of claim 32, comprising assigning characters of a plurality of characters to each of a plurality of positions of the second appendage.

34. The system of claim 33, wherein the plurality of positions is established relative to a coordinate origin.

35. The system of claim 34, comprising establishing the coordinate origin using a position selected from a group consisting of an absolute position and orientation in space, a fixed position and orientation relative to the body irrespective of an overall position and heading of the body, and interactively in response to an action of the body.

36. The system of claim 33, comprising assigning characters of the plurality of characters to each of a plurality of orientations of the first appendage.

37. The system of claim 31, wherein the detecting comprises detecting when an extrapolated position of the body intersects virtual space, wherein the virtual space comprises space depicted on a display device coupled to the computer.

38. The system of claim 37, wherein controlling the component comprises controlling a virtual object in the virtual space when the extrapolated position intersects the virtual object.

39. The system of claim 38, wherein controlling the component comprises controlling a position of the virtual object in the virtual space in response to the extrapolated position in the virtual space.

40. The system of claim 38, wherein controlling the component comprises controlling attitude of the virtual object in the virtual space in response to the gesture.

41. The system of claim 1, comprising controlling scaling of the detecting and controlling to generate coincidence between virtual space and physical space, wherein the virtual space comprises space depicted on a display device coupled to the processor, wherein the physical space comprises space inhabited by the body.

42. The system of claim 41, comprising controlling at least one virtual object in the virtual space in response to movement of at least one physical object in the physical space.

43. The system of claim 1, wherein the controlling includes at least one of controlling a function of an application hosted on the processor and controlling a component displayed on the processor.

44. A method comprising:
 imaging a body with an imaging system, the imaging comprising generating wavefront coded images of the body;
 automatically detecting a gesture of a body, wherein the gesture comprises an instantaneous state of the body, wherein the detecting comprises aggregating only gesture data of the gesture and precluding use of background data in the detecting of the gesture, the gesture data comprising absolute three-space focus-resolved location data of an instantaneous state of the body at a point in time and space;
 translating the gesture to a gesture signal; and
 controlling a component coupled to a computer in response to the gesture signal.

45. The method of claim 44, wherein the imaging system comprises a plurality of optical detectors, wherein at least two of the optical detectors are wavefront coded cameras comprising a wavefront coding optical element.

46. The method of claim 44, wherein the imaging comprises generating wavefront coded images of the body.

47. The method of claim 44, wherein the imaging system comprises a plurality of optical detectors, wherein at least two of the optical detectors are wavefront coded cameras comprising a phase mask that increases a depth of focus of the imaging.

48. The method of claim 44, wherein the gesture data comprises focus-resolved range data of the body within the depth of field.

49. The method of claim 48, wherein the focus-resolved range data of the body within the depth of field is derived from an output of the imaging system.

50. The method of claim 44, wherein the gesture data comprises focus-resolved position data of the body within the depth of field.

51. The method of claim 50, wherein the focus-resolved position data of the body within the depth of field is derived from an output of the imaging system.

52. The method of claim 44, comprising generating modulation transfer functions and point spread functions that are invariant to a distance between the body and the imaging system.

53. The method of claim 44, comprising generating modulation transfer functions and point spread functions that are invariant with respect to defocus.

54. The method of claim 44, comprising generating intermediate images by coding images gathered by the wavefront coded cameras.

55. The method of claim 54, wherein the intermediate images are blurred.

56. The method of claim 54, wherein the intermediate images are insensitive to changes in the body or a plurality of optical detectors of the imaging system that include defocus aberrations.

57. The method of claim 44, wherein the gesture data is three-space location data representing the gesture.

58. The method of claim 44, wherein the detecting includes detecting a location of the body.

59. The method of claim 44, wherein the detecting includes detecting an orientation of the body.

60. The method of claim 44, wherein the detecting includes detecting motion of the body.

61. The method of claim 44, wherein the detecting comprises identifying the gesture, wherein the identifying includes identifying a pose and an orientation of a portion of the body.

62. The method of claim 44, wherein the detecting includes detecting at least one of a first set of appendages and a second set of appendages of the body.

63. The method of claim 44, wherein the detecting includes dynamically detecting a position of at least one tag.

64. The method of claim 63, wherein the detecting includes detecting position of a set of tags coupled to a part of the body.

65. The method of claim 64, wherein each tag of the set of tags includes a pattern, wherein each pattern of each tag of the set of tags is different than any pattern of any remaining tag of the plurality of tags.

66. The method of claim 44, wherein the detecting includes dynamically detecting and locating a marker on the body.

67. The method of claim 66, wherein the detecting includes detecting position of a set of markers coupled to a part of the body.

68. The method of claim 66, wherein the set of markers form a plurality of patterns on the body.

69. The method of claim 66, wherein the detecting includes detecting position of a plurality of appendages of the body using a set of markers coupled to each of the appendages.

70. The method of claim 44, wherein the translating comprises translating information of the gesture to a gesture notation.

71. The method of claim 70, wherein the gesture notation represents a gesture vocabulary, and the gesture signal comprises communications of the gesture vocabulary.

72. The method of claim 71, wherein the gesture vocabulary represents in textual form instantaneous pose states of kinematic linkages of the body.

73. The method of claim 71, wherein the gesture vocabulary represents in textual form an orientation of kinematic linkages of the body.

74. The method of claim 71, wherein the gesture vocabulary represents in textual form a combination of orientations of kinematic linkages of the body.

75. The method of claim 71, wherein the gesture vocabulary includes a string of characters that represent a state of kinematic linkages of the body.

76. The method of claim 75, wherein the kinematic linkage is at least one first appendage of the body.

77. The method of claim 76, comprising assigning each position in the string to a second appendage, the second appendage connected to the first appendage.

78. The method of claim 77, comprising assigning characters of a plurality of characters to each of a plurality of positions of the second appendage.

79. The method of claim 78, wherein the plurality of positions is established relative to a coordinate origin.

80. The method of claim 79, comprising establishing the coordinate origin using a position selected from a group consisting of an absolute position and orientation in space, a fixed position and orientation relative to the body irrespective of an overall position and heading of the body, and interactively in response to an action of the body.

81. The method of claim 78, comprising assigning characters of the plurality of characters to each of a plurality of orientations of the first appendage.

82. The method of claim 76, wherein the detecting comprises detecting when an extrapolated position of the body intersects virtual space, wherein the virtual space comprises space depicted on a display device coupled to the computer.

83. The method of claim 82, wherein controlling the component comprises controlling a virtual object in the virtual space when the extrapolated position intersects the virtual object.

84. The method of claim 83, wherein controlling the component comprises controlling a position of the virtual object in the virtual space in response to the extrapolated position in the virtual space.

85. The method of claim 83, wherein controlling the component comprises controlling attitude of the virtual object in the virtual space in response to the gesture.

86. The method of claim 44, comprising controlling scaling of the detecting and controlling to generate coincidence between virtual space and physical space, wherein the virtual space comprises space depicted on a display device coupled to the processor, wherein the physical space comprises space inhabited by the body.

87. The method of claim 86, comprising translating scale, angle, depth, and dimension between the virtual space and the physical space as appropriate to at least one application coupled to the processor.

88. The method of claim 86, comprising controlling at least one virtual object in the virtual space in response to movement of at least one physical object in the physical space.

89. The method of claim 44, wherein the controlling includes controlling a function of an application hosted on the processor.

90. The method of claim 44, wherein the controlling includes controlling a component displayed on the processor.

* * * * *